US012701170B2

(12) United States Patent
Jung et al.

(10) Patent No.: US 12,701,170 B2
(45) Date of Patent: Aug. 4, 2026

(54) METHOD AND DEVICE FOR CONNECTING DEVICE TO SERVICE

(71) Applicant: Samsung Electronics Co., Ltd., Suwon-si (KR)

(72) Inventors: Sooyeon Jung, Suwon-si (KR); Sungdong Kim, Suwon-si (KR); Hyunseob Oh, Suwon-si (KR); Jihye Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 18/837,755

(22) PCT Filed: Feb. 21, 2023

(86) PCT No.: PCT/KR2023/002476
§ 371 (c)(1),
(2) Date: Aug. 12, 2024

(87) PCT Pub. No.: WO2023/158289
PCT Pub. Date: Aug. 24, 2023

(65) Prior Publication Data
US 2025/0141972 A1 May 1, 2025

(30) Foreign Application Priority Data

Feb. 21, 2022 (KR) ........................ 10-2022-0022503

(51) Int. Cl.
*H04L 67/51* (2022.01)
*H04B 5/00* (2024.01)
*H04L 12/28* (2006.01)

(52) U.S. Cl.
CPC .............. *H04L 67/51* (2022.05); *H04B 5/00* (2013.01); *H04L 12/2807* (2013.01)

(58) Field of Classification Search
CPC ..... H04L 67/51; H04L 67/12; H04L 12/2807; H04L 12/28; H04B 5/00; G16Y 40/30; H04W 4/80
See application file for complete search history.

(56) References Cited

U.S. PATENT DOCUMENTS 9,906,605 B2 * 2/2018 Nguyen .................. H04L 67/51
11,463,130 B1 * 10/2022 Garner .................... H04L 67/12
(Continued)

FOREIGN PATENT DOCUMENTS

JP        2020-107332 A    7/2020
KR    10-2013-0019260 A    2/2013
(Continued)

OTHER PUBLICATIONS

Lee, Keuntae et al. Future Generation Computer Systems, a framework for DNS naming services for Internet-of-Things devices. Future Generation Computer Systems. vol. 92, pp. 617-627, Mar. 2019.
Chiu, Jih-Ching et al. Design and Implement Robust Wireless Network Based on TCP Protocol. 2020 International Computer Symposium (ICS). Feb. 23, 2021.
(Continued)

*Primary Examiner* — Richard G Keehn
(74) *Attorney, Agent, or Firm* — Jefferson IP Law, LLP

(57) ABSTRACT
The present disclosure provides a method by which an electronic device uses an auxiliary device so as to connect an IoT device to an IoT service. The method of the present disclosure may comprise the steps of: receiving, from an IoT device, basic information about the IoT device through an auxiliary device; discovering, on the basis of the basic information, the IoT device by using one from among one or more discovery methods; and registering the discovered IoT device with the IT service.

19 Claims, 20 Drawing Sheets

(56)     References Cited

U.S. PATENT DOCUMENTS

| | | | | |
|---|---|---|---|---|
| 2014/0310742 | A1* | 10/2014 | Kim | H04N 21/485 |
| | | | | 725/110 |
| 2015/0006719 | A1* | 1/2015 | Gupta | H04L 67/51 |
| | | | | 709/224 |
| 2018/0218466 | A1* | 8/2018 | Mowatt | G06Q 30/0635 |
| 2019/0182649 | A1* | 6/2019 | Best | H04L 67/51 |
| 2019/0327135 | A1* | 10/2019 | Johnson | H04W 4/70 |
| 2020/0169886 | A1* | 5/2020 | Bhatt | H04W 12/08 |
| 2021/0329329 | A1* | 10/2021 | Du | H04W 4/80 |
| 2023/0035368 | A1* | 2/2023 | Kim | H04L 67/12 |
| 2023/0237427 | A1* | 7/2023 | Ojha | G06K 7/1417 |
| | | | | 705/28 |
| 2025/0054008 | A1* | 2/2025 | Cella | G06N 5/043 |

FOREIGN PATENT DOCUMENTS

| | | | |
|---|---|---|---|
| KR | 10-2013-0131088 | A | 12/2013 |
| KR | 10-2015-0121126 | A | 10/2015 |
| KR | 10-1864276 | B1 | 5/2018 |
| KR | 10-2019-0095593 | A | 8/2019 |
| KR | 10-2020-0055167 | A | 5/2020 |
| KR | 10-2020-0069060 | A | 6/2020 |
| KR | 10-2367186 | B1 | 2/2022 |

OTHER PUBLICATIONS

International Search Report and Written Opinion dated May 16, 2023, issued in International Patent Application No. PCT/KR2023/002476.

* cited by examiner

METHOD AND DEVICE FOR CONNECTING DEVICE TO SERVICE

CROSS-REFERENCE TO RELATED APPLICATION(S)

This application is a U.S. National Phase Entry of PCT International Application No. PCT/KR2023/002476, which was filed on Feb. 21, 2023, and claims priority to Korean Patent Application No. 10-2022-0022503, which was filed on Feb. 21, 2022 in the Korean Intellectual Property Office, the entire disclosure of which is incorporated herein by reference.

TECHNICAL FIELD

The disclosure relates to a method and device for connecting a device to a service and, more specifically, to a method and device for connecting and registering an internet of things (IoT) device to an IoT service.

BACKGROUND ART

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

To use these IoT devices, it is necessary to connect/register the IoT device to the IoT service.

DETAILED DESCRIPTION OF THE INVENTION

Technical Problem

The disclosure provides a method for connecting/registering an IoT device to an IoT service using an auxiliary device.

Technical Solution

According to various embodiments of the disclosure, a method for connecting an Internet of things (IoT) device to an IoT service using an auxiliary device, by an electronic device may comprise receiving basic information about the IoT device from the IoT device through the auxiliary device, discovering the IoT device using one of at least one discovery method based on the basic information, and registering the discovered IoT device with the IoT service.

According to various embodiments of the disclosure, an electronic device for connecting an Internet of things (IoT) device to an IoT service using an auxiliary device may comprise a transceiver and a controller connected to the transceiver. The controller may be configured to receive basic information about the IoT device from the IoT device through the auxiliary device, discover the IoT device using one of at least one discovery method based on the basic information, and register the discovered IoT device with the IoT service.

According to various embodiments of the disclosure, a method for connecting an Internet of things (IoT) device to an IoT service using an auxiliary device by an electronic device may comprise receiving basic information about the IoT device from the IoT device through the auxiliary device, transmitting temporal network connection information or network connection information for network connection to the IoT device through the auxiliary device, discovering the IoT device pre-connected to the network using the temporal network connection information or the network connection information, using a first discovery method, and registering the discovered IoT device with the IoT service.

According to various embodiments of the disclosure, an electronic device for connecting an Internet of things (IoT) device to an IoT service using an auxiliary device may comprise a transceiver and a controller connected to the transceiver. The controller may be configured to receive basic information about the IoT device from the IoT device through the auxiliary device, transmit temporal network connection information or network connection information for network connection to the IoT device through the auxiliary device, discover the IoT device pre-connected to the network using the temporal network connection information or the network connection information, using a first discovery method, and register the discovered IoT device with the IoT service.

Advantageous Effects

The disclosure provides a method for connecting/registering an IoT device to an IoT service using an auxiliary device, thereby efficiently connecting/registering the IoT device.

MODE FOR CARRYING OUT THE INVENTION

Figure 1:
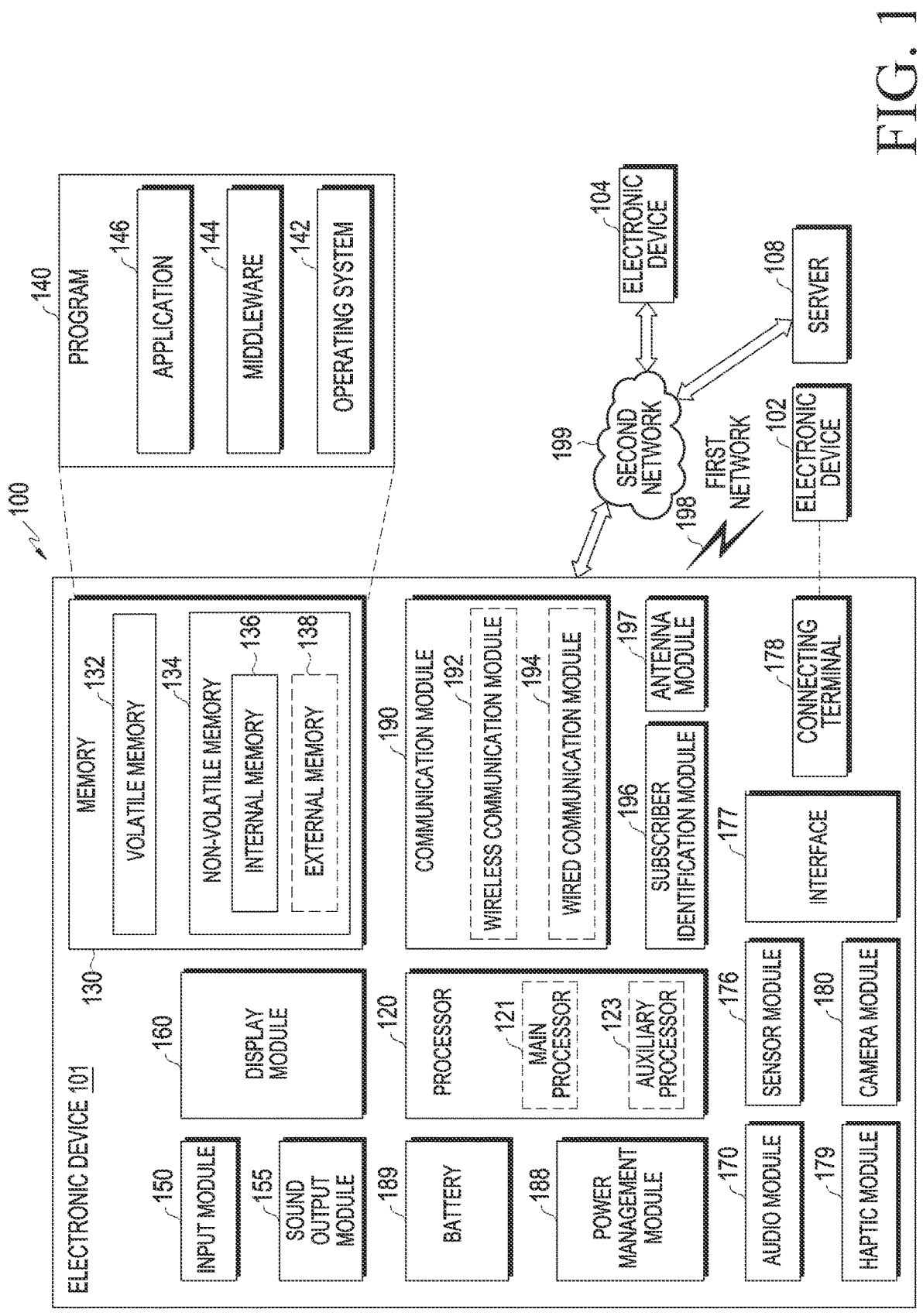
FIG. 1 is a block diagram schematically illustrating an electronic device.

Hereinafter, embodiments of the present invention are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments of the disclosure, a " . . . unit" may include one or more processors.

Hereinafter, the operational principle of the disclosure is described below with reference to the accompanying drawings. When determined to make the subject matter of the disclosure unnecessarily unclear, the detailed description of known functions or configurations may be skipped in describing embodiments of the disclosure. The terms as used herein are defined considering the functions in the present disclosure and may be replaced with other terms according to the intention or practice of the user or operator. Therefore, the terms should be defined based on the overall disclosure.

Hereinafter, embodiments of the present invention are described in detail with reference to the accompanying drawings. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

The terminology used herein is provided for a better understanding of the disclosure, and changes may be made thereto without departing from the technical spirit of the disclosure.

FIG. 1 is a block diagram schematically illustrating an electronic device.

In the embodiment of FIG. 1, the electronic device may correspond to one of a commissioner device, a commissionee device, an auxiliary device, or an access point (AP), which is described below.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present invention, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Disclosed is a method, performed by an electronic device, of connecting/registering and managing/controlling another electronic device to a specific service/platform.

In the disclosure, the electronic device that registers the other electronic device in a specific service/platform may be referred to as a commissioner. The commissioner may be an electronic device including a service/platform (e.g., an IoT service/platform) for connecting/registering another electronic device (e.g., an IoT device). For example, the commissioner may be an electronic device such as a smartphone, a voice assistant, or a TV equipped with an IoT platform. In the disclosure, the commissioner may be referred to as a commissioner apparatus/device, a registration subject apparatus/device, a first electronic apparatus/device, a controller, and a controller apparatus/device.

In the disclosure, the electronic device to be registered may be referred to as a commissionee. The commissionee may be an electronic device (e.g., an IoT device) to be connected/registered to a specific service/platform (e.g., an IoT service/platform). For example, the commissionee may be an electronic device such as a smart light bulb or a home appliance connected to an IoT platform. In the disclosure, the commissionee may be referred to as a commissionee apparatus/device, an IoT apparatus/device, a smart home apparatus/device, a registered subject apparatus/device, a second electronic apparatus/device, a controllee, and a controllee apparatus/device.

Further, the disclosure discloses a procedure for a commissioner device to initially connect/register a commissionee device to a specific service/platform. In this way, the initially connected/registered commissionee device may be managed/controlled by the commissioner device.

In the disclosure, the initial connection/registration procedure for the commissionee device may be referred to as commissioning or a commissioning procedure.

Upon initial connection/registration, basic information about the commissionee device may be transferred to the commissioner device, and the basic information may be used for discovery of the commissionee device and device connection/registration. In the disclosure, the basic information about the commissionee device may be referred to as device connection information and device registration information.

As an embodiment, the basic information about the commissionee device may include, e.g., information about the product ID, the passcode, and/or the discovery scheme supported by the commissionee device.

As an embodiment, the basic information about the commissionee device may be included in an onboarding payload. The onboarding payload is information/data including basic information about the commissionee device, and may be provided in the form of, e.g., a QR code, an NFC tag, or a numeric code (e.g., an 11-digit or 12-digit numeric code (e.g., a manual pairing code of 11 (or 12) digits)). The onboarding payload may be provided, e.g., in the form of a sticker attached to the commissionee device or in the form of being displayed on the display of the commissionee device. Accordingly, the basic information about the commissionee device may be provided to the commissioner device and may be used for initial connection/registration.

[Commissioning Basic Procedure]

Figure 2A:
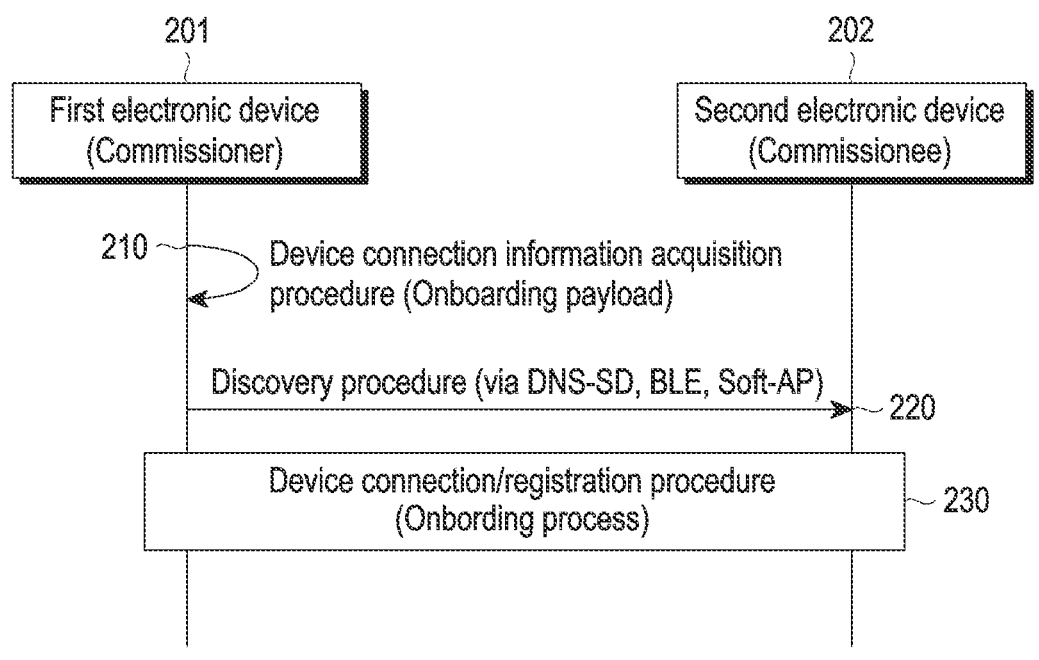
FIG. 2A illustrates an initial connection procedure of a commissioning device.

FIG. 2A illustrates an initial connection procedure of a commissioning device.

The initial connection procedure of FIG. 2A corresponds to a basic procedure performed by a first electronic device (commissioner device) 201 and a second electronic device (commissionee device) 202 without the help of a separate auxiliary device for commissioning.

In the embodiment of FIG. 2A, the initial connection procedure of the device may include a device connection information acquisition procedure, a device discovery procedure, and/or a device connection/registration procedure. Hereinafter, each procedure is exemplarily described with reference to FIG. 2.

<Device Connection Information Acquisition Information (Onboarding Payload Acquisition Procedure)>

Referring to FIG. 2A, in operation 210, the commissioner device 201 may obtain basic information (device connection information) about the commissionee device 202. For example, the commissioner device 201 may obtain an onboarding payload including basic information about the commissionee device 202. As an embodiment, the commissioner device 201 obtain the basic may information/onboarding payload of the commissionee device 202 by scanning the QR code of the commissionee device 202, reading the NFC tag of the commissionee device 202, or inputting the numeric code of the commissionee device 202.

<Device Discovery Procedure>

In procedure 220, the commissioner device 201 may perform a discovery procedure with the commissionee device 202 using the obtained basic information (device connection information) about the commissionee device 202. For example, the commissioner device 201 may discover the commissionee device 202 through one of at least one discovery method. As an embodiment, the at least one discovery method may include, but is not limited to, a domain name service (DNS)-service discovery (SD) method, a Bluetooth low energy (BLE) discovery method, and/or a software enabled access point (Soft-AP) discovery method. As an embodiment, the information used to identify/determine the discovery method used for discovery of the commissionee device 202 may be included in the basic information about the commissionee device 202.

<Device Connection/Registration Procedure (Onboarding Process)>

In procedure 230, the commissioner device 201 may perform a device connection/registration procedure with the commissionee device 202. Through procedure 230, the commissionee device 202 may be initially connected/registered to the commissioner device 201 (or the IoT platform of the commissioner device 201). In the disclosure, the device connection/registration procedure of procedure 230 may be referred to as an onboarding process.

As an embodiment, procedure 230 may include at least one operation for device verification and/or IoT service connection/registration. For example, procedure 230 may include a password verification operation between the commissioner device 201 and the commissionee device 202, an operation in which the commissioner device 201 verifies the commissionee device 202, an operation in which the commissioner device 201 transfers network connection information (e.g., an AP credential) to the commissionee device 202, an operation in which the commissionee device 202 connects to a network (e.g., a Wi-Fi network) using network connection information (e.g., an AP credential), and/or an operation in which the commissioner device 201 completes registration of the commissionee device 202 and network connection.

Meanwhile, when the commissioner device 201 is an electronic device (e.g., a smartphone) having mobility, basic information/onboard payload of the commissionee device 202 may be easily obtained by scanning a QR code or inputting a numeric code of the commissionee device 202 through the commissioner device 201 moved near the commissionee device 202. Alternatively, when the commissioner device 201 is an electronic device (e.g., a voice assistant) having a voice recognition function, basic information/onboard payload of the commissionee device 202 may be easily obtained through a voice input to the numeric code of the commissionee device 202 of the user.

However, when the commissioner device 201 is an electronic device (e.g., a TV) having no mobility and/or voice recognition function, QR code scan and/or numerical code input through voice recognition is difficult. Therefore, in order to obtain the basic information/onboard payload of the commissionee device 202, the user should manually input the numeric code of the commissionee device 202 or scan the QR code through a separate auxiliary device (e.g., the remote controller (RC) connected to the commissioner device 201).

However, when an auxiliary device such as an RC does not have a QR code scan function, the QR code scan may not be performed. Further, inputting a long numeric code through the separate auxiliary device such as RC may cause inconvenience to the user in terms of UX.

Therefore, when it is necessary to use a separate auxiliary device for commissioning due to the restrictive characteristics of the commissioner device 201, various methods for efficiently performing commissioning need to be considered.

Hereinafter, various embodiments for the commissioner device 201 to efficiently input/register (commission) the commissionee device 202 using the auxiliary device are described with reference to each drawing.

[Commissioning Procedure Using Auxiliary Device]

Figure 2B:
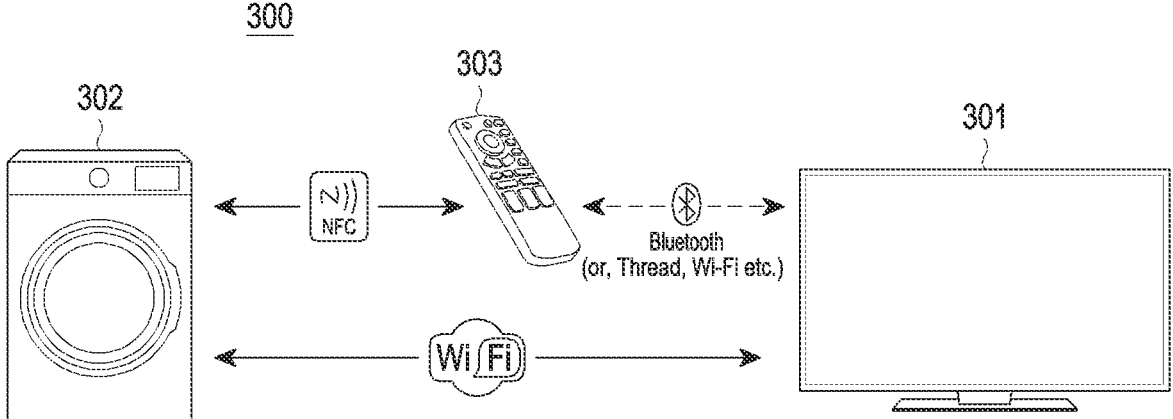
FIG. 2B illustrates an example of a communication system for performing an initial connection procedure of a commissionee device using an auxiliary device according to an embodiment of the disclosure.

FIG. 2B illustrates an example of a communication system for performing an initial connection procedure of a commissionee device using an auxiliary device according to an embodiment of the disclosure.

Referring to FIG. 2B, the communication system 300 may include a first electronic device (a commissioner device) 301, a second electronic device (a commissionee device) 302, and a third electronic device (an auxiliary device) 303.

The commissioner device 301 may be an electronic device including a service/platform (e.g., an IoT service/ platform) for connecting/registering the commissionee device 302. For example, as illustrated, the commissioner device 301 may be an electronic device such as a TV equipped with an IoT platform, but is not limited thereto.

The commissionee device 302 may be an electronic device to be connected to/registered with a specific service/platform (e.g., an IoT service/platform) of the commissioner device 301. For example, as illustrated, the commissionee device 302 may be an electronic device (IoT device) such as a washing machine (WM) connected to an IoT platform, but is not limited thereto.

The auxiliary device 303 may be an electronic device including at least one function for assisting in commissioning between the commissioner device 301 and the commissionee device 302. For example, as illustrated, the auxiliary device 303 may be an electronic device such as an RC including at least one function for assisting in commissioning (e.g., a communication function with the commissionee device 302 (e.g., an NFC communication function, a UWB communication function, etc.) and/or a communication function with the commissioner device 301 (e.g., Bluetooth, Wi-Fi, thread, etc.), but is not limited thereto. In the disclosure, the auxiliary device 303 may be referred to as a commissioning auxiliary device or a third electronic device.

In the embodiment of FIG. 2B, the AP network for service connection (e.g., an IoT service connection) may be, e.g., a Wi-Fi network, but is not limited thereto.

In the following embodiments, it is assumed that the above-described auxiliary device 303 having an NFC communication function (e.g., NFC reader/writer) is used to assist in commissioning in order to provide an enhanced on-boarding experience. The auxiliary device 303 may obtain the onboarding payload of the commissionee device 302 using the NFC function, may transfer the onboarding payload to the commissioner device 301, and may transfer network connection information (e.g., AP credential information) from the commissioner device 301 to the commissionee device 302. The commissioner device 301 and the commissionee device 302 may complete the initial connection/registration procedure by performing a device discovery procedure and a device connection/registration procedure through a specific discovery method (e.g., DNS-SD) using information (onboarding payload/network connection information) exchanged through the auxiliary device 302.

Hereinafter, for convenience of description, an example in which the commissioner device 301 is a TV, the commissionee device 302 is a WM providing an onboarding payload in the form of an NFC tag, and the auxiliary device 303 is an RC having an NFC communication function is described. However, embodiments of the disclosure are not limited thereto, and embodiments of the disclosure may be applied to other electronic devices having the same/similar functions/features.

Figure 3:
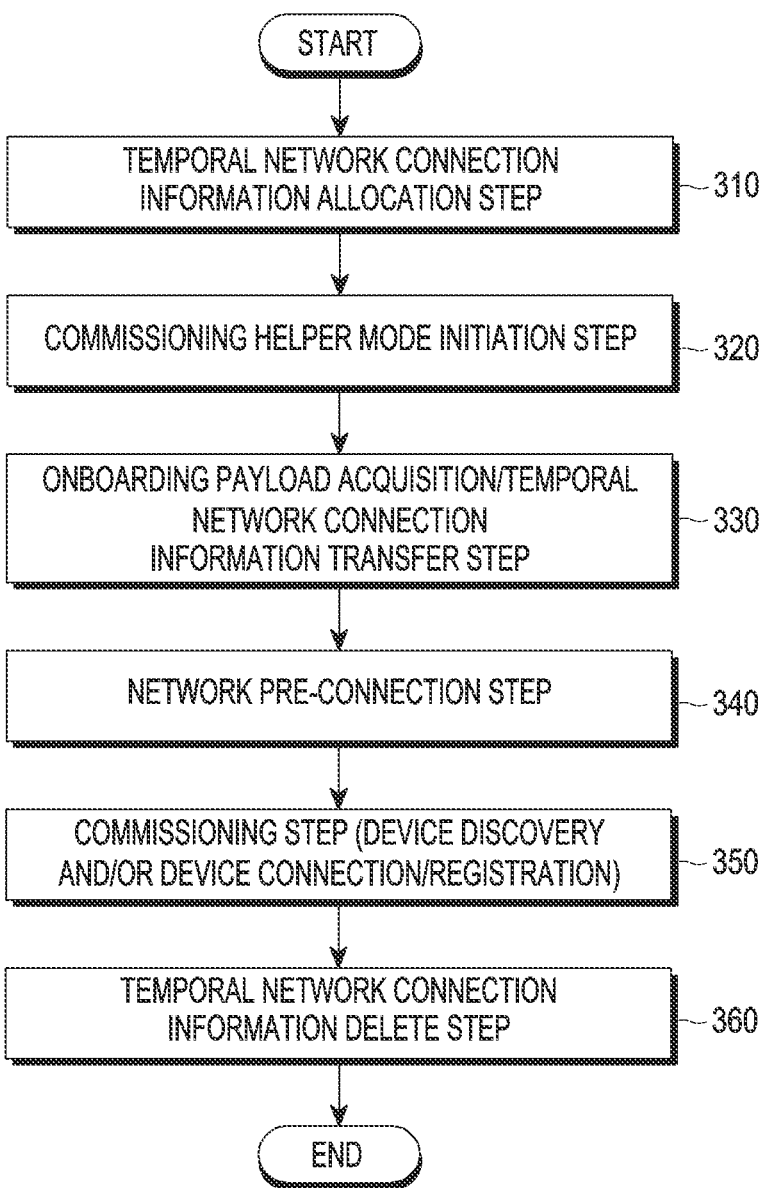
FIG. 3 illustrates an initial connection method of a commissioning device using an auxiliary device, according to a first embodiment of the disclosure.

Embodiment 1 (Embodiment of FIGS. 3 to 5)

Embodiment 1 corresponds to an embodiment in which, before performing a device connection/registration procedure for commissioning, a commissioner device (commissioner) obtains basic information about a commissionee device (commissionee) using an auxiliary device and transfers temporal network connection information (e.g., a temporal AP credential) to the commissionee device, thereby pre-connecting the commissionee device to a network.

Hereinafter, embodiment 1 is exemplarily described with reference to FIGS. 3 to 5.

FIG. 3 illustrates an initial connection method of a commissioning device using an auxiliary device, according to a first embodiment of the disclosure.

The initial connection method of the first embodiment of FIG. 3 corresponds to a procedure performed by a commissioner device (first electronic device), a commissionee device (second electronic device), a commissioning auxiliary device (assistant device), and/or an AP (AP device).

As described above, in the first embodiment, unlike the second embodiment to be described below, temporal network connection information is used as network information. Hereinafter, embodiments are described assuming that the temporal network connection information is a temporal AP credential including a temporal service set identifier (SSID) and/or a temporal password for a commissionee device, but embodiments are not limited thereto.

Referring to FIG. 3, the initial connection method may include a temporal network connection information allocation step (phase) 310, a commissioning helper mode initiation step 320, an onboarding payload acquisition/temporal network connection information transfer step 330, a network pre-connection step 340, a commissioning step 350, and/or a temporal network connection information deletion step 360. According to an embodiment, some steps may be omitted, additional steps may be further performed, or steps may be performed in a different order from the disclosed order.

Step 310 may be a step for the commissioner device to allocate temporal network connection information (temporal AP credential) for commissioning. As an embodiment, the temporal AP credential may be a per-device credential. Here, the per-device credential does not refer to applying the same AP credential (e.g., the same SSID/password) to all devices connected to the AP, but refers to applying a different AP credential (e.g., a different SSID and/or a different password) to each device connected to the AP. Through this step 310, a temporal AP credential used for commissioning of the commissionee device may be generated. An example of step 310 is described below with reference to step 410 of FIG. 4.

Step 320 may be a step for allowing the commissioner device to operate the auxiliary device as a commissioning helper. In other words, step 320 may be a step of initiating the commissioning helper mode of the auxiliary device. As an embodiment, the commissioning helper mode may be an NFC-based commissioning helper mode (NFC commissioning helper mode). An example of step 320 is described below with reference to step 420 of FIG. 4.

Step 330 may be a step in which the commissioner device transfers temporal network connection information (temporal AP credential) to the commissionee device through the auxiliary device, and obtains an onboarding payload from the commissionee device. According to an embodiment, the auxiliary device may transfer temporal network connection information (temporal AP credential) to the commissionee device through NFC (NFC connection) and obtain an onboarding payload from the commissionee device.

As an embodiment, the onboarding payload may include information associated with AP pre-connection capability for the commissionee device WM. In an embodiment, the information associated with the AP pre-connection capability may include information explicitly or implicitly indicating whether the commissionee device WM supports the AP pre-connection (AP pre-connection function). An example of step 330 is described below with reference to step 430 of FIG. 4.

Step 340 may be a step for the commissionee device to be pre-connected to the network AP using temporal network connection information (temporal AP credential). Here, the pre-connection may mean that the commissionee device is connected to the AP before commissioning. An example of step 340 is described below with reference to step 440 of FIG. 4.

Step 350 may be a step including a device discovery procedure and a device connection/registration procedure for commissioning. The device discovery procedure of step 350 may correspond to procedure 220 of FIG. 2, and the onboarding process of step 350 may correspond to procedure 240 of FIG. 2. However, in step 350, since the commissionee device is pre-connected to the AP, a DSN-SD discovery method may be used instead of the Soft-AP and BLE discovery methods for device discovery. An example of step 350 is described below with reference to step 450 of FIG. 4.

Step 360 may be a step for the commissioner device to delete temporal network connection information (temporal AP credential) stored in the AP. An example of step 360 is described below with reference to step 460 of FIG. 4.

Figure 4A:
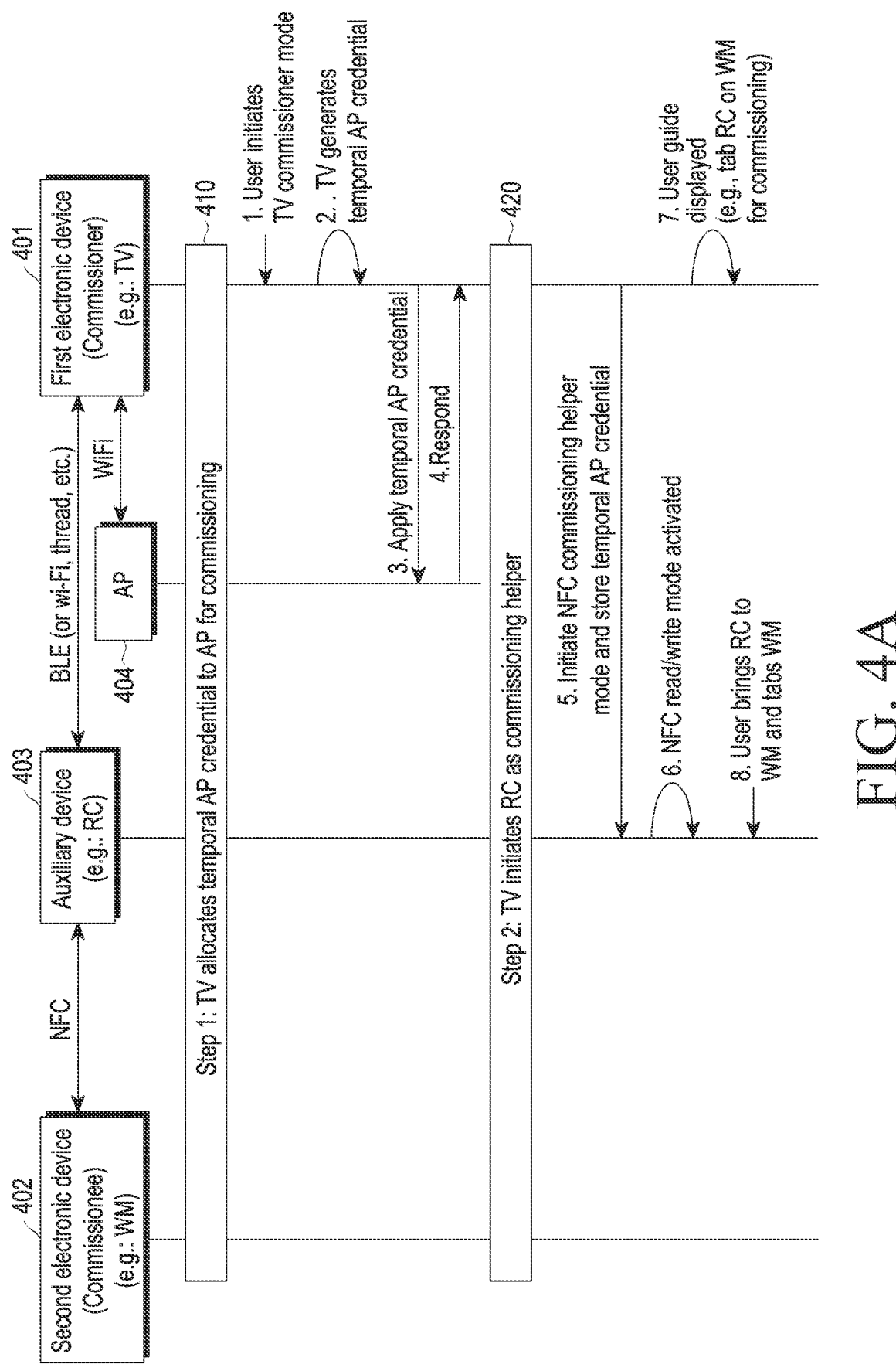
FIGS. 4A, 4B, and 4C illustrate an example of an initial connection method of a commissioning device using an auxiliary device according to the first embodiment of the disclosure.
Figure 4B:
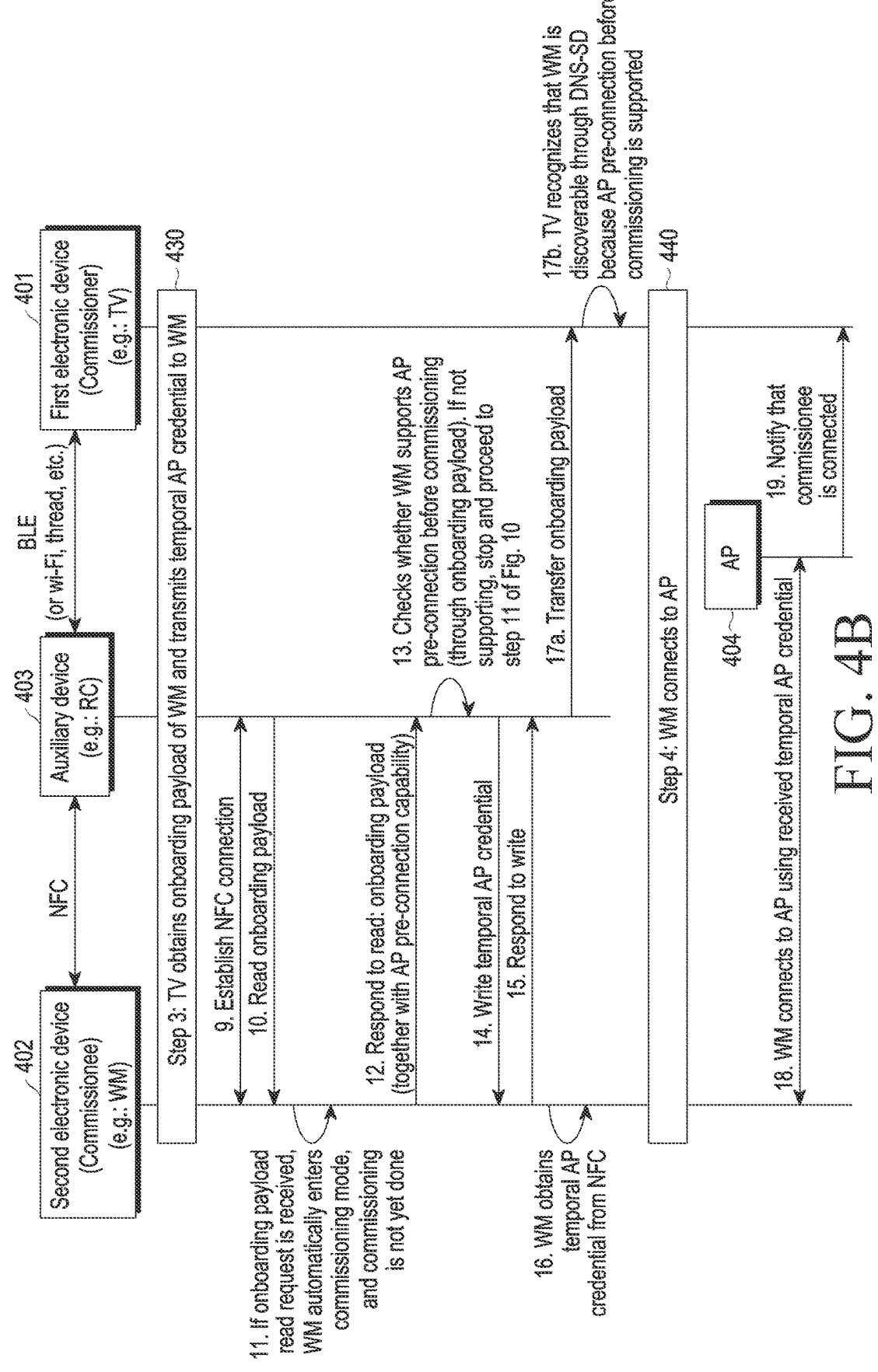
Figure 4C:
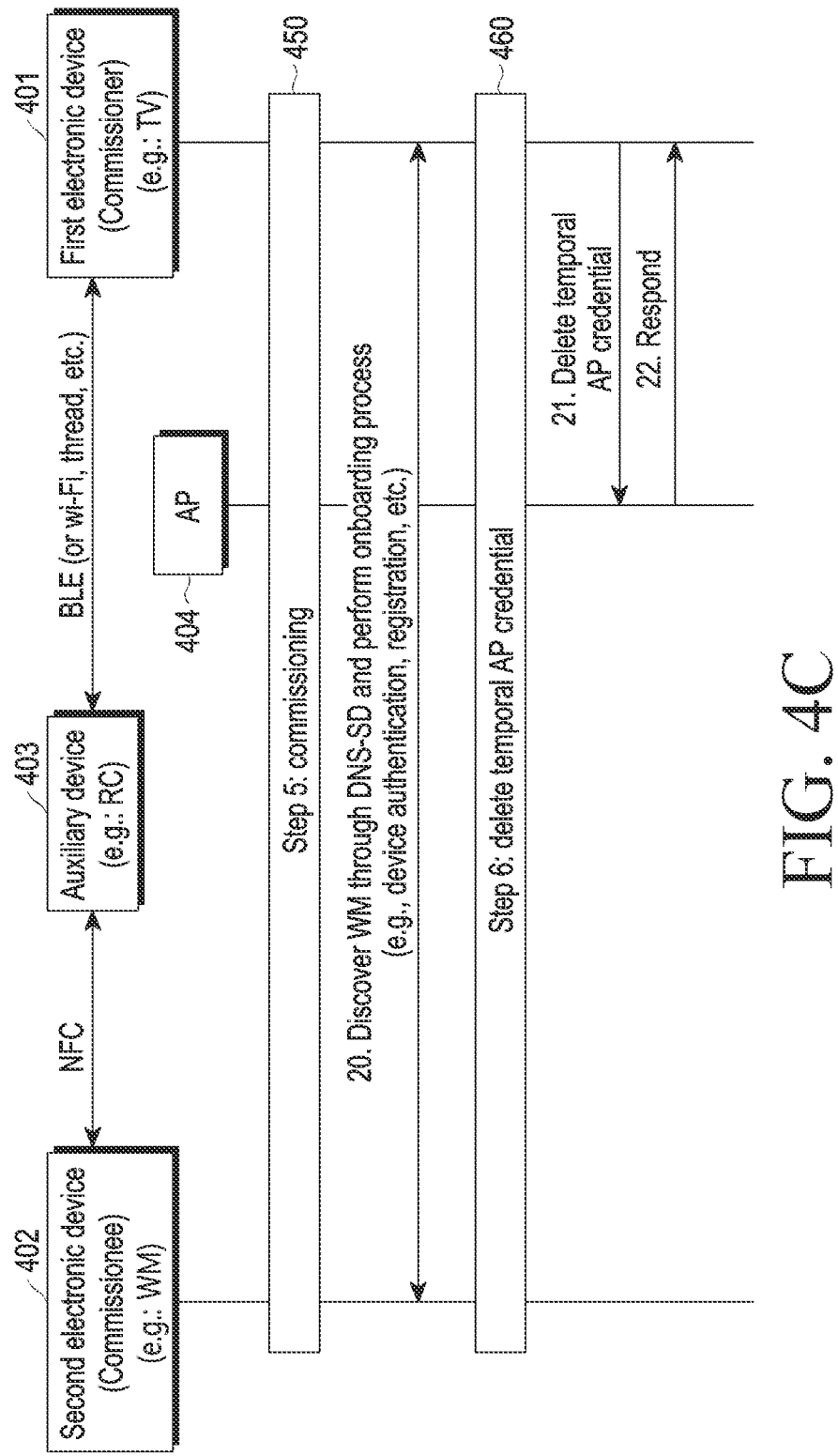

FIGS. 4A to 4C illustrate an example of an initial connection method of a commissioning device using an auxiliary device according to the first embodiment.

In the embodiment of FIGS. 4A to 4C, a TV is described as an example of a first electronic device (a commissioner device) 401, a WM is described as an example of a second electronic device (a commissionee device) 402, and an RC is described as an example of an auxiliary device 403, but the embodiment is not limited thereto as described above.

In the embodiment of FIGS. 4A to 4C, it is exemplified that the commissioner device 401 communicates with the AP 404 via Wi-Fi, the commissioner device 401 communicates with the auxiliary device 403 via BLE (or Wi-Fi, thread), and the auxiliary device 403 communicates with the second electronic device 402 via NFC, but the disclosure is not limited thereto.

As described above, in the first embodiment, unlike the second embodiment to be described below, temporal network connection information is used as network information. Hereinafter, embodiments are described assuming that the temporal network connection information is a temporal AP credential including a temporal SSID and/or a temporal password for the commissionee device 402, but embodiments are not limited thereto.

<Temporal Network Connection Information Allocation Step (Phase) (Step 410)>

Step of FIG. 4A may be a step in which the commissioner device (TV) 401 allocates temporal network connection information (temporal AP credential) for commissioning. As an embodiment, the temporal AP credential may be a per-device credential. Here, the per-device credential does not refer to applying the same AP credential (e.g., the same SSID/password) to all the devices connected to the AP 404, but to applying a different AP credential (e.g., a different SSID/password) to each device connected to the AP 404. Through this step 410, a temporal AP credential used for commissioning of the commissionee device (WM) 402 may be generated.

Step 410 may include at least one of the following operations/procedures. According to an embodiment, some operations/procedures of step 410 may be omitted, additional operations/procedures may be further performed, or operations/procedures may be performed in a different order from the disclosed order.

Operation 1: Operation 1 may be an operation of starting a commissioner mode (TV commissioner mode) of the commissioner device (TV) 401. In operation 1, the commissioner mode of the commissioner device (TV) 401 may be initiated by a user input. When the commissioner mode is started, the commissioner device (TV) 401 may start an operation for commissioning as a commissioner.

Operation 2: Operation 2 may be an operation in which the commissioner device (TV) 401 generates a temporal AP credential. As an embodiment, the temporal AP credential may include a temporal SSID and/or a temporal password.

Operation 3: Operation 3 may be an operation in which the commissioner device (TV) 401 transmits a request for applying a temporal AP credential to the AP 404 ("Apply temporal AP credential" request) to the AP 404. The request of FIG. 3 may be referred to as a temporal AP credential application request.

Operation 4: Operation 4 may be an operation in which the commissioner device (TV) 401 receives a response corresponding to the temporal AP credential application request from the AP 404.

<Commissioning Helper Mode Initiation Step (Step 420)>

Operation 420 of FIG. 4A may be an operation for allowing the commissioner device TV 401 to operate the auxiliary device (RC) 403 as a commissioning helper. In other words, step 420 may be a step of initiating the commissioning helper mode of the auxiliary device (RC) 403. As an embodiment, the commissioning helper mode may be an NFC-based commissioning helper mode (NFC commissioning helper mode).

As an embodiment, the auxiliary device (RC) 403 may be previously connected to the commissioner device TV 401 through a predefined communication scheme. As an embodiment, the predefined communication scheme may be BLE, Wi-Fi, or thread.

Step 420 may include at least one of the following operations/procedures. According to an embodiment, some operations/procedures of step 420 may be omitted, additional operations/procedures may be further performed, or operations/procedures may be performed in a different order from the disclosed order.

Operation 5: Operation 5 may be an operation in which the commissioner device TV 401 transmits, to the auxiliary device (RC), a request (initiation request) for allowing the auxiliary device (RC) 403 to initiate a commissioning helper mode (NFC commissioning helper mode) and/or a request (storage request) for storing a temporal AP credential. As an embodiment, the initiation request and the storage request may be transmitted as one request.

Operation 6: Operation 6 may be an operation in which the auxiliary device (RC) 403 activates the NFC read/write mode. As an embodiment, in response to the initiation request and/or storage request of operation 5, the auxiliary device (RC) 403 may activate the NFC Read/Write mode (NFC communication function).

Operation 7: Operation 7 may be an operation in which the commissioner device (TV) 401 displays a user guide for commissioning. For example, the commissioner device (TV) 401 may display a user guide to tab the auxiliary device (RC) 403 on the commissionee device (WM) 402 for commissioning.

Operation 8: Operation 8 may be an operation applied to the auxiliary device (RC) 403 according to the user guide of operation 7. For example, when the user guide is a guide to tab the auxiliary device (RC) 403 on the commissionee device (WM) 402 for commissioning, the user may tap the auxiliary device (RC) 403 on the commissionee device (WM) 402.

<Onboarding Payload Acquisition/Temporal Network Connection Information Transfer Step (Step 430)>

Step 430 of FIG. 4B may be a step in which the commissioner device (TV) 401 transfers temporal network connection information (temporal AP credential) to the commissionee device through the auxiliary device (RC) 403 and obtains an onboarding payload from the commissionee device (WM) 402.

Step 430 may include at least one of the following operations/procedures. According to an embodiment, some operations/procedures of step 430 may be omitted, additional operations/procedures may be further performed, or operations/procedures may be performed in a different order from the disclosed order.

Operation 9: Operation 9 may be an operation in which an NFC connection is established between the auxiliary device (RC) 403 and the commissionee device (WM) 402. The NFC connection establishment operation of operation 9 may be initiated when operation 8 is successfully performed. For example, when the auxiliary device (RC) 403 is normally tabbed on the commissionee device (WM) 402 according to the user guide, the NFC connection establishment operation of operation 9 may be started. The so established NFC connection may be used for subsequent communication/ operation between the auxiliary device (RC) 403 and the commissionee device (WM) 402.

Operation 10: Operation 10 may be an operation in which the auxiliary device (RC) 403 transmits a request for reading an onboarding payload ("Read Onboarding payload" request) to the commissionee device (WM) 402 through an NFC connection. The request of operation 10 may be referred to as an onboarding payload read request. As an embodiment, the onboarding payload read request may be included in a message (e.g., an "onboarding payload read" message) and transmitted.

Operation 11: Operation 11 may be an operation in which the commissionee device (WM) 402 enters the commissioning mode. In an embodiment, when the onboarding payload read request is received and the commissioning has not yet been performed, the commissionee device (WM) 402 may automatically enter the commissioning mode. In this case, the commissionee device (WM) 402 may perform a preset operation for commissioning as the commissionee.

Operation 12: Operation 12 may be an operation in which the auxiliary device (RC) 403 receives a response (a read response (Read rep)) corresponding to the onboarding payload read request from the commissionee device (WM) 402 through the NFC connection. As an embodiment, the read response may include an onboarding payload. As an embodiment, the onboarding payload may include information associated with AP pre-connection capability for the commissionee device (WM) 402. In an embodiment, the information associated with the AP pre-connection capability may include information explicitly or implicitly indicating whether the commissionee device (WM) 402 supports the AP pre-connection (AP pre-connection function).

Operation 13: Operation 13 may be an operation in which the auxiliary device (RC) 403 identifies whether the commissionee device (WM) 402 supports AP pre-connection before commissioning, based on the on-boarding payload. When the commissionee device (WM) 402 supports AP pre-connection, operation 14 may be performed. When the commissionee device (WM) 402 does not support AP pre-connection, the first embodiment of FIG. 4 may be terminated, and operation 11 of the third embodiment of FIG. 10, which is described below, may be performed. As described above, when the commissionee device (WM) 402 does not support the AP pre-connection, the method of the first embodiment based on the pre-connection may not be performed, and the commissioning should be performed in the same manner as the method of the third embodiment.

Operation 14: Operation 14 may be an operation in which the auxiliary device (RC) 403 transmits a "Write temporal AP credential" request for writing a temporal AP credential to the commissionee device (WM) 402. The request of operation 14 may be referred to as a temporal AP credential write request. As an embodiment, the temporal AP credential write request may include a temporal AP credential. As an embodiment, the temporal AP credential may be stored in the NFC of the commissionee device (WM) 402 by the temporal AP credential write request.

Operation 15: Operation 14 may be an operation in which the auxiliary device (RC) 403 receives a response (Write rep) corresponding to the temporal AP credential write request from the commissionee device (WM) 402.

Operation 16: Operation 16 may be an operation in which the commissionee device (WM) 402 obtains a temporal AP credential. As an embodiment, the commissionee device (WM) 402 may obtain the temporal AP credential from the temporal AP credential write request. In an embodiment, by the temporal AP credential write request in operation 14, the temporal AP credential may be stored in the NFC of the commissionee device (WM) 402, and the commissionee device (WM) 402 (or the processor/controller of the commissionee device (WM) 402) may read and obtain the temporal AP credential from the NFC.

Operation 17a: Operation 17a may be an operation in which the auxiliary device (RC) 403 transfers the onboarding payload to the commissioner device (TV) 401.

Operation 17b: Operation 17b may be an operation in which the commissioner device (TV) 401 recognizes/identifies that the commissionee device (WM) 402 is discoverable through DNS-SD, because the commissionee device (WM) 402 supports AP pre-connection before commissioning. As an embodiment, the commissioner device (TV) 401 may identify that the commissionee device (WM) 402 supports AP pre-connection before commissioning, based on the information included in the onboarding payload.

<Network Pre-Connection Step (Step 440)>

Step 440 of FIG. 4B may be a step in which the commissionee device (WM) 402 is pre-connected to the network AP 404 using temporal network connection information (temporal AP credential).

Step 440 may include at least one of the following operations/procedures. According to an embodiment, some operations/procedures of step 440 may be omitted, additional operations/procedures may be further performed, or operations/procedures may be performed in a different order from the disclosed order.

Operation 18: Operation 18 may be an operation in which the commissionee device (WM) 402 connects to the AP 404 using the temporal AP credential. The commissionee device (WM) 402 may be pre-connected to the AP 404 by performing a predefined connection procedure using a temporal AP credential.

Operation 19: Operation 19 may be an operation in which the AP 404 notifies the commissioner device (TV) 401 that the commissionee device (WM) 402 is connected to the AP 404. Accordingly, the commissioner device (401) may identify that the commissionee device 402 is pre-connected to the AP 404, and may perform a procedure of discovering the commissionee device 402 through the DSN-SD.

<Commissioning Step (Step 450)>

Step 450 of FIG. 4C may be an operation including a device discovery procedure and a device connection/registration procedure for commissioning.

Step 450 may include at least one of the following operations/procedures. According to an embodiment, some operations/procedures of step 450 may be omitted, additional operations/procedures may be further performed, or operations/procedures may be performed in a different order from the disclosed order.

Operation 20: Operation 20 may be an operation including a device discovery procedure and an onboarding process through DSN-SD performed between the commissioner device (TV) 401 and the commissionee device (WD) 402. The device discovery procedure of operation 20 may correspond to procedure 220 of FIG. 2, and the onboarding process of operation 20 may correspond to procedure 240 of FIG. 2. However, in operation 20, a DSN-SD discovery method is used rather than a Soft-AP and BLE discovery method for device discovery.

<Temporal Network Connection Information Delete Step (Step 460)>

Step 460 of FIG. 4C may be a step in which the commissioner device (TV) 401 deletes temporal network connection information (temporal AP credential) stored in the AP 404.

Step 460 may include at least one of the following operations/procedures. According to an embodiment, some operations/procedures of step 360 may be omitted, additional operations/procedures may be further performed, or operations/procedures may be performed in a different order from the disclosed order.

Operation 21: Operation 21 may be an operation in which the commissioner device (TV) 401 transmits a request/command for deleting the temporal AP credential to the AP 404. Based on this command, the AP 404 may delete the stored temporal AP credential.

Operation 22: Operation 22 may be an operation in which the commissioner device (TV) 401 receives a response corresponding to a request/command for deleting the temporal AP credential from the AP 404.

The first embodiment of the initial connection procedure of the commissioning device using the above-described auxiliary device may have the following benefits.

UX Perspective (Better UX)

In the first embodiment, since the onboarding payload may be obtained through NFC, the user does not need to passively input an 11- or 12-digit numeric code (pass code) through the auxiliary device 403.

In the first embodiment, by the tab operation of the auxiliary device (RC) 403, the commissionee device (WD) 402 may identify the user intent for the commissioning and may automatically start the commissioning mode. Accordingly, the commissioning mode of the commissionee device (WD) 402 may be easily triggered.

In the first embodiment, since the AP pre-connection through the temporal AP credential is performed, the discovery procedure of the DSN-SD method may be used without using the Soft-AP method. Therefore, unlike the case of using the Soft-AP method that causes disconnection of the streaming service of the commissioner device (TV) 401 during the commissioning, the streaming service may not be disconnected during the commissioning procedure.

(2) Security Perspective (High Security)

In the first embodiment, because the temporal AP credential is used for commissioning, the AP credential may not be exposed to the commissionee device (WM) 402 until the commissionee device (WM) 402 is successfully commissioned.

(3) Implementation Perspective (Low Implementation Burden)

In the first embodiment, since a simple device such as an RC may be used as the auxiliary device 403, the commissioner device (TV) 401 does not need to rely on a smartphone (or a smartphone application) for commissioning.

In the first embodiment, the commissionee device (WM) 402 does not need to implement discovery of other devices such as soft-AP or BLE other than discovery of DSN-SD.

(4) Efficiency Perspective

In the first embodiment, the device discovery time may be reduced by limiting the discovery channel to DNS-SD.

In the first embodiment, by first providing the temporal AP credential to the commissionee device (WM) 402, both the commissioner device (TV) 401 and the commissionee device (WM) 402 may discover each other through DSN-SD.

Figure 5A:
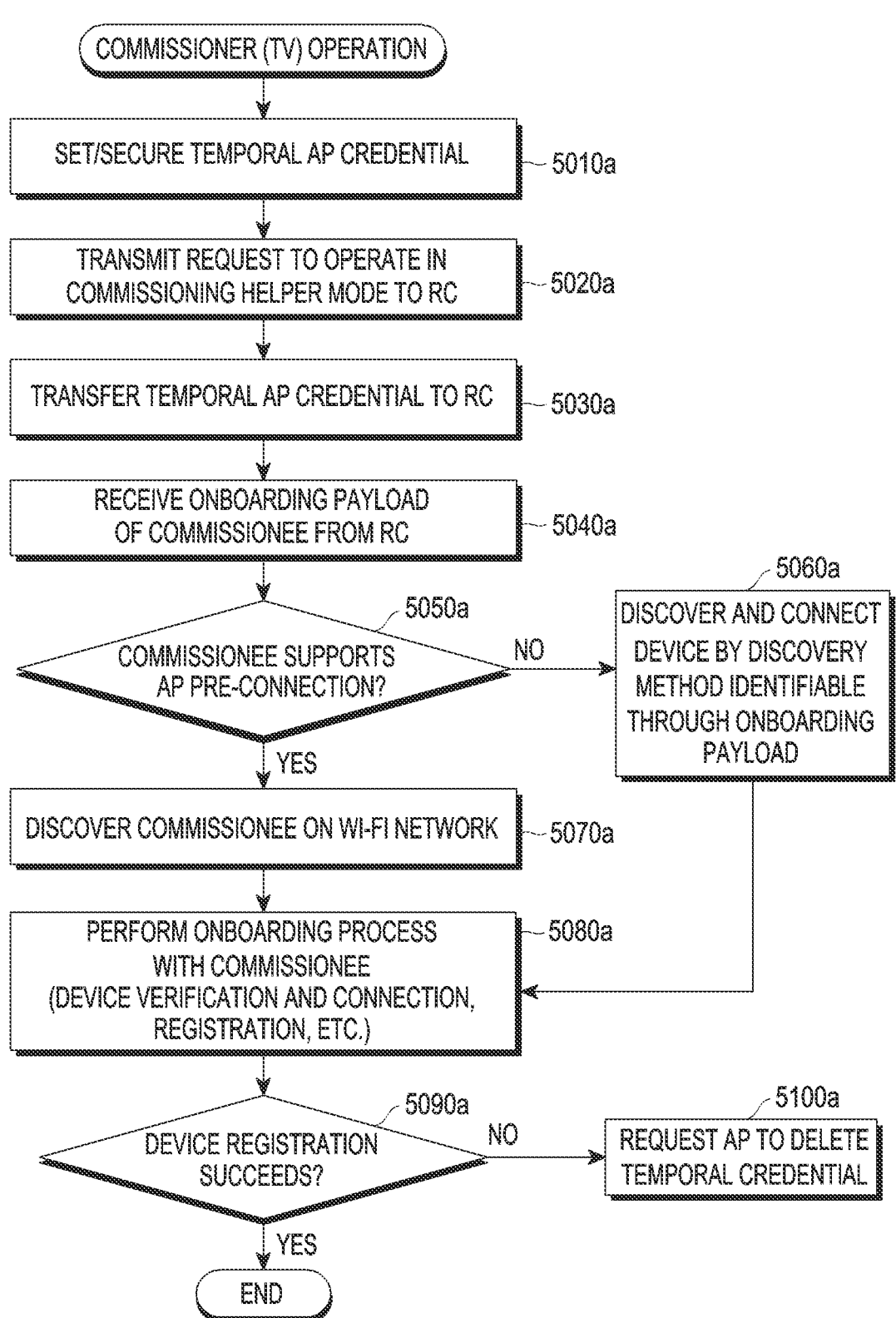
FIG. 5A exemplarily illustrates an operation of a commissioner device performing an initial connection method of a commissioning device using an auxiliary device according to the first embodiment of the disclosure.

FIG. 5A exemplarily illustrates an operation of a commissioner device performing an initial connection method of a commissioning device using an auxiliary device according to the first embodiment of the disclosure.

In the embodiment of FIG. 5A, a TV is described as an example of a commissioner device, a WM is described as an example of a commissionee device, an RC is described as an example of an auxiliary device, and a Wi-Fi device (network) is described as an example of an AP device (network), but embodiments are not limited thereto as described above.

Further, the embodiment of FIG. 5A illustrates that the commissioner device TV communicates with the AP through Wi-Fi, the commissioner device TV communicates with the auxiliary device (RC) through BLE (or Wi-Fi, thread), and the auxiliary device (RC) communicates with the commissionee device WM through NFC, but embodiments are not limited thereto.

As described above, in the first embodiment, unlike the second embodiment to be described below, temporal network connection information is used as network information. Hereinafter, embodiments are described assuming that the temporal network connection information is a temporal AP credential including a temporal SSID and/or a temporal password for the commissionee device (WM), but embodiments are not limited thereto.

Referring to FIG. 5A, in operation 5010a, the commissioner device (TV) may obtain a temporal AP credential for commissioning.

In an embodiment, the commissioner device (TV) may directly generate/allocate a temporal AP credential. In this case, the commissioner device (TV) may set the temporal AP credential generated in the AP. This may follow the operations illustrated in operation 3/4 of FIG. 4A.

In another embodiment, the commissioner device (TV) may request a temporal AP credential from the AP and receive the temporal AP credential from the AP. In this case, the temporal AP credential may be generated/allocated by the AP.

In operation 5020a, the commissioner device (TV) may transmit a request for allowing the auxiliary device (RC) to operate in the commissioning helper mode to the auxiliary device (RC).

In operation 5030a, the commissioner device (TV) may transfer the temporal AP credential to the auxiliary device (RC). Meanwhile, according to an embodiment, the temporal AP credential may be included in the request of operation 5020a and transmitted. In this case, operation 5020a and operation 5030a may be performed as one operation.

In operation 5040a, the commissioner device (TV) may receive an onboarding payload of the commissionee device (WM) from the auxiliary device (RC).

In operation 5050a, the commissioner device (TV) may determine whether the commissionee device (WM) supports AP pre-connection.

Embodiment A

Embodiment A corresponds to an embodiment in which the commissioner device (TV) directly identifies whether the commissionee device (WM) supports AP pre-connection based on the AP pre-connection capability field/information included in the onboarding payload of the commissionee device (WM).

In embodiment A, the commissioner device (TV) may determine whether the commissionee device (WM) supports AP pre-connection, based on the AP pre-connection capability information included in the onboarding payload of the commissionee device (WM).

Table 1 below shows an example of an onboarding payload including AP pre-connection capability information. (packed binary data structure for onboarding payload)

TABLE 1

| Packed Binary Data Structure for Onboarding Payload | | | |
|---|---|---|---|
| Onboarding Payload Element | Size (bits) | Required | Notes |
| Version | 3 | Yes | 3-hit value specifying the QR code payload version. SHALL be 000. |
| Vendor ID | 16 | Yes | |
| Product ID | 16 | Yes | |
| Custom Flow | 2 | Yes | Device Commissioning Flow 0: Standard commissioning flow: such a device, when uncommissioned, always enters commissioning mode upon power-up, subject to the rules in Section 5.4.2.2, "Announcement Commencement". 1: User-intent commissioning flow: user action required to enter commissioning mode. 2: Custom commissioning flow: interaction with a vendor-specified means is needed before commissioning. |

TABLE 1-continued

| | | | |
|---|---|---|---|
| Packed Binary Data Structure for Onboarding Payload | | | |
| Onboarding Payload Element | Size (bits) | Required | Notes |
| | | | 3: Reserved |
| Discovery Capabilities Bitmask | 8 | Yes | Defined in table below. |
| Discriminator | 12 | Yes | 12-bit as defined in Discriminator |
| Passcode | 27 | Yes | See Section 5.1.6, "Generation of the Passcode" |
| AP Pre-connection capability | 1 | Yes | 0: Device not support AP pre-connection before commissioning<br>1: Device support AP pre-connection |
| Padding | 4 | Yes | Bit-padding of '0's to expand to the nearest byte boundary, thus byte-aligning any TLV Data that follows. |
| TLV Data | Variable | No | Variable length TLV data. Zero length if TLV is not included. This data is byte-aligned. See TLV Data sections below for detail. |

Referring to Table 1, the AP pre-connection capability information may indicate whether a device (a commissionee device) supports AP pre-connection before commissioning. For example, the AP pre-connection capability information may be set to a first value (e.g., 0) indicating that the device does not support AP pre-connection before commissioning or a second value (e.g., 1) indicating that the device supports AP pre-connection before commissioning.

As described above, when the onboarding payload of the commissionee device (WM) includes information/field explicitly indicating whether the commissionee device (WM) supports AP pre-connection, the commissioner device (TV) may determine whether the commissionee device (WM) supports AP pre-connection based on the value of the information.

Embodiment B

Embodiment B corresponds to an embodiment in which the commissioner device (TV) identifies whether the commissionee device (WM) supports AP pre-connection based on information included in a manufacturer-specific element included in the TLV data field/information of the onboarding payload. Embodiment B corresponds to an embodiment in which AP pre-connection capability related information is included as a sub element/information of the manufacturer-specific element that is an onboarding payload element, unlike embodiment A in which AP pre-connection capability related information is included as an onboarding payload element of an onboarding payload.

As shown in Table 1, the onboarding payload may include TLV data information, and the TLV data information may include the manufacturer-specific element. In this case, the manufacturer-specific element may include various types of data/information that may be designated/specified by the manufacturer. For example, information (AP pre-connection capability related information) used to determine whether the commissionee device (WM) supports AP pre-connection may be included in the manufacturer-specific element. As an embodiment, the AP pre-connection capability related information may be the AP pre-connection capability information of Table 1, but is not limited thereto.

In this case, the commissioner device (TV) may determine whether the commissionee device (WM) supports the AP pre-connection based on the AP pre-connection capability information included in the manufacturer-specific element.

Embodiment C

Embodiment C corresponds to an embodiment of directly identifying whether the commissionee device (WM) supports AP pre-connection based on device information in the onboarding payload. Embodiment C corresponds to an embodiment in which AP pre-connection capability related information is not explicitly included in the onboarding payload, unlike embodiment A/B.

As shown in Table 1, the onboarding payload may include device information such as a vendor ID field/information and a product ID field/information.

In this case, the commissioner device (TV) may obtain the performance information about the corresponding device from an associated server (e.g., a distributed server that provides the device information about the corresponding device) using the device information included in the onboarding payload. For example, the commissioner device (TV) may request the performance information about the corresponding device from the associated server using the device information included in the onboarding payload, and may receive the performance information from the corresponding server.

The performance information about the corresponding device received/obtained from the server may include information (AP pre-connection capability related information) used to determine whether the commissionee device (WM) supports AP pre-connection. As an embodiment, the AP pre-connection capability related information may be the AP pre-connection capability information of Table 1, but is not limited thereto.

When the commissionee device (WM) does not support AP pre-connection, it moves to operation 5060a.

In operation 5060a, the commissioner device (TV) may perform an operation/procedure for discovering the commissionee device using the discovery method identified based on the onboarding payload. For example, the commissioner device (TV) may perform an operation/procedure for discovering the commissionee device (WM) using any one of the DSN-SD, BLE, and Soft-AP discovery methods, based on the on-boarding payload. For example, the commissioner device (TV) may perform an operation/procedure for discovering the commissionee device (WM) while circulating the DSN-SD, BLE, and Soft-AP discovery methods.

When the commissionee device (WM) supports AP pre-connection, it moves to operation 5070a.

In operation 5070a, the commissioner device (TV) may perform an operation/procedure for discovering the commissionee device (WM) using the DSN-SD discovery method.

Embodiment A

In this embodiment, the commissioner device (TV) may directly/immediately perform an operation for discovering the commissionee device (WM) on an AP network (e.g., a Wi-Fi network) for a preset period. As such, In embodiment A, unlike embodiment B/C to be described below, in which the operation of discovering the commissionee device (WM) is initiated by a notification/request of another device, the operation of discovering the commissionee device (WM) may be directly initiated by the commissioner device (TV).

Embodiment B

In this embodiment, when the commissioner device (TV) receives a notification indicating that the commissionee device (WM) has joined an AP network (e.g., a Wi-Fi network) from the auxiliary device (RC), the commissioner device (TV) may perform an operation for discovering the commissionee device (WM) on the AP network.

Embodiment C

In this embodiment, when the commissioning request is received from the commissionee device (WM) joining the AP network (e.g., Wi-Fi network), the commissioner device (TV) may perform an operation for discovering the commissionee device (WM) on the AP network. As an embodiment, this commissioning request may be performed using, e.g., the user directed commissioning protocol of the matter standard of the connectivity standards alliance (CAS).

In operation 5080a, the commissioner device (TV) may perform an onboarding process with the commissionee device (WM). As an embodiment, the onboarding process may include the above-described device verification operation and/or device connection/registration operation. Accordingly, the commissionee device (WM) may be connected/registered to an IoT platform (or a smart home network).

In operation 5090a, the commissioner device (TV) may determine whether registration of the commissionee device (WM) is successful.

When the registration of the commissionee device (WM) is not successful, in operation 5100a, the commissioner device (TV) may transmit a request for deleting the temporal AP credential to the AP.

Figure 5B:
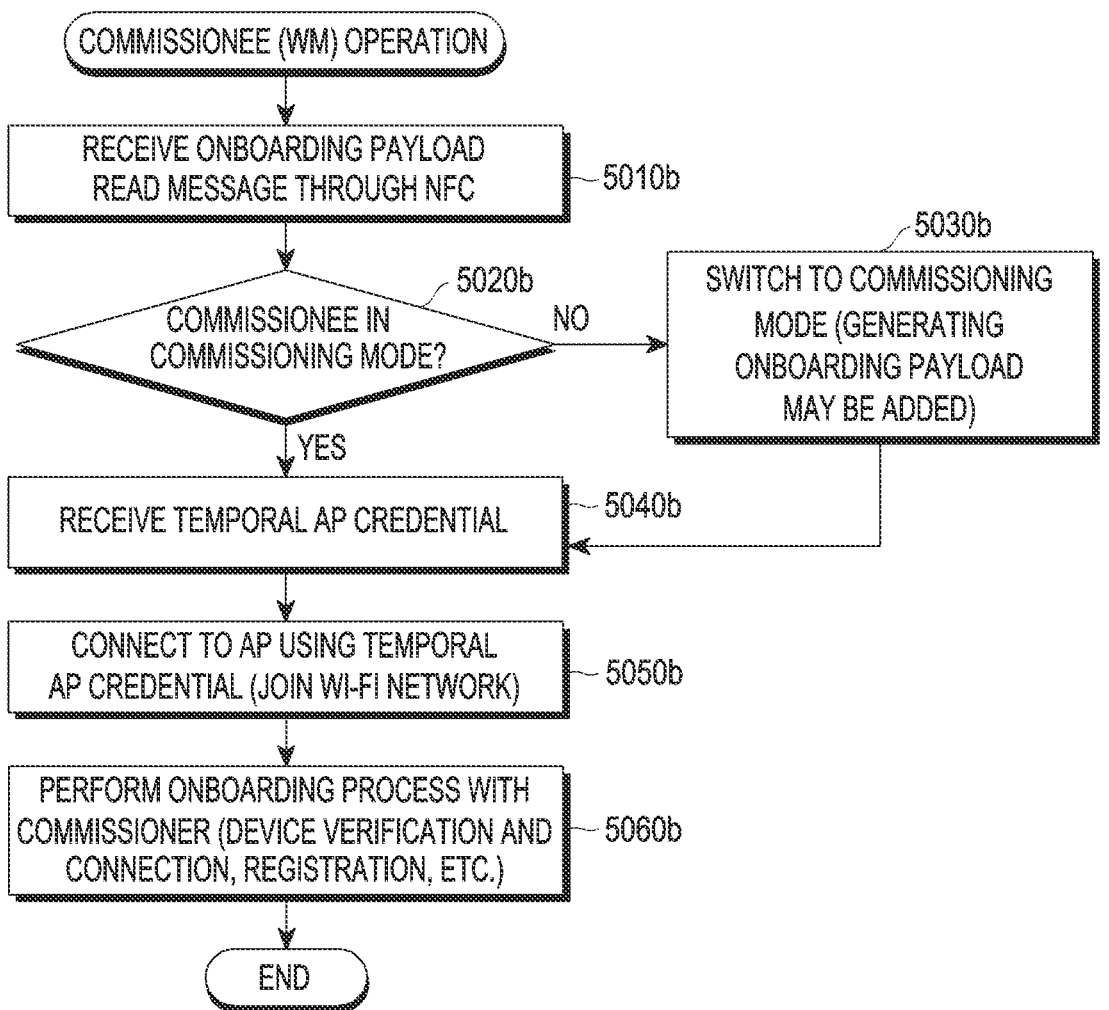
FIG. 5B exemplarily illustrates an operation of a commissionee device performing an initial connection method of a commissioning device using an auxiliary device according to the first embodiment of the disclosure.

FIG. 5B exemplarily illustrates an operation of a commissionee device performing an initial connection method of a commissioning device using an auxiliary device according to the first embodiment of the disclosure.

In the embodiment of FIG. 5B, a TV is described as an example of the commissioner device, a WM is described as an example of the commissionee device, an RC is described as an example of the auxiliary device, and a Wi-Fi device (network) is described as an example of the AP device (network), but embodiments are not limited thereto as described above.

Further, the embodiment of FIG. 5B illustrates that the commissioner device (TV) communicates with the AP via Wi-Fi, the commissioner device (TV) communicates with the auxiliary device (RC) via BLE (or Wi-Fi, thread), and the auxiliary device (RC) communicates with the commissionee device (WM) via NFC, but embodiments are not limited thereto.

As described above, in the first embodiment, unlike the second embodiment to be described below, temporal network connection information is used as network information. Hereinafter, embodiments are described assuming that the temporal network connection information is a temporal AP credential including a temporal SSID and/or a temporal password for the commissionee device (WM), but embodiments are not limited thereto.

Referring to FIG. 5B, in operation 5010b, the commissionee device (WM) may receive an onboarding payload read message through NFC (NFC connection). According to an embodiment, the commissionee device (WM) may receive an onboarding payload read message from the auxiliary device (RC) through an NFC connection configured with the auxiliary device (RC). As an embodiment, the onboarding payload read message may include the onboarding payload read request described with reference to FIG. 4.

In operation 5020b, the commissionee device (WM) may determine whether the commissionee device (WM) is in the commissioning mode.

When the commissionee device (WM) is not in the commissioning mode, in operation 5030b, the commissionee device (WM) may switch the operation mode to the commissioning mode. If necessary, in operation 5030b, the commissionee device (WM) may further perform an operation of generating an onboarding payload.

When the commissionee device (WM) is in the commissioning mode, in operation 5040b, the commissionee device (WM) may receive a temporal AP credential. According to an embodiment, the commissionee device (WM) may receive a temporal AP credential from the auxiliary device (RC) through an NFC connection configured with the auxiliary device (RC).

In operation 5050b, the commissionee device (WM) may connect to the AP using the temporal AP credential. Accordingly, the commissionee device (WM) may be joined/pre-connected to the AP network.

In operation 5060b, the commissionee device (WM) may perform an onboarding process with the commissioner device (TV). As an embodiment, the onboarding process may include the above-described device verification operation and/or device connection/registration operation. Accordingly, the commissionee device (WM) may be connected to an IoT platform (or a smart home network).

Figure 5C:
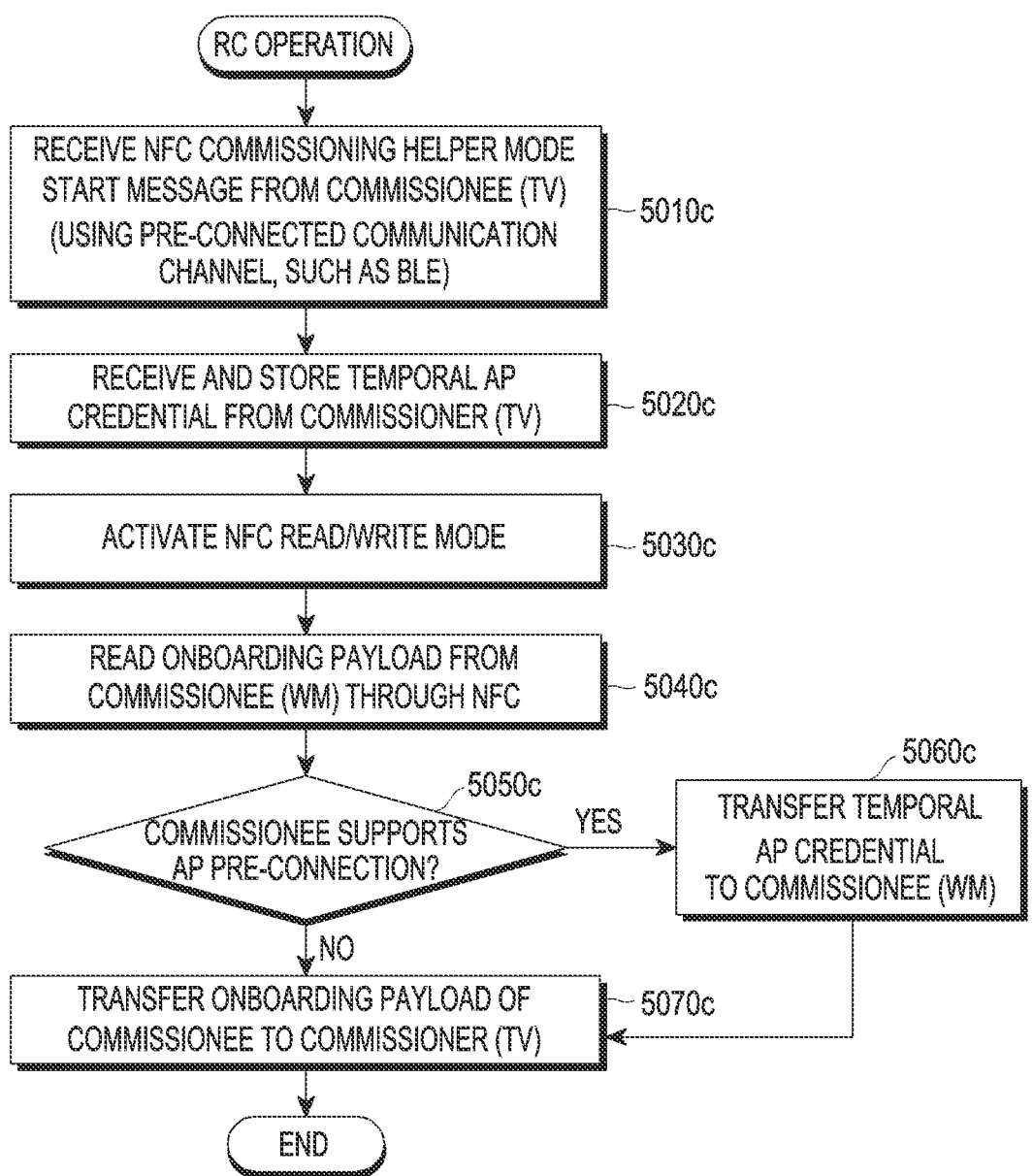
FIG. 5C illustrates an operation of an auxiliary device performing an initial connection method of a commissioning device using the auxiliary device according to the first embodiment of the disclosure.

FIG. 5C illustrates an operation of an auxiliary device performing an initial connection method of a commissioning device using the auxiliary device according to the first embodiment of the disclosure.

In the embodiment of FIG. 5C, a TV is described as an example of the commissioner device, a WM is described as an example of the commissionee device, an RC is described as an example of the auxiliary device, and a Wi-Fi device (network) is described as an example of the AP device (network), but embodiments are not limited thereto as described above.

Further, the embodiment of FIG. 5C illustrates that the commissioner device (TV) communicates with the AP via Wi-Fi, the commissioner device (TV) communicates with the auxiliary device (RC) via BLE (or Wi-Fi, thread), and the auxiliary device (RC) communicates with the commissionee device (WM) via NFC, but embodiments are not limited thereto.

As described above, in the first embodiment, unlike the second embodiment to be described below, temporal network connection information is used as network information. Hereinafter, embodiments are described assuming that the temporal network connection information is a temporal AP credential including a temporal SSID and/or a temporal password for the commissionee device (WM), but embodiments are not limited thereto.

Referring to FIG. 5C. in operation 5010c, the auxiliary device (RC) may receive a commissioning helper mode start message from the commissioner device (TV). As an embodiment, the auxiliary device may receive the commissioning helper mode start message using a pre-connected communication channel (e.g., BLE). As an embodiment, the com-missioning helper mode may be an NFC-based commissioning helper mode.

In operation 5020c, the auxiliary device (RC) may receive the temporal AP credential from the commissioner device (TV) and store the received temporal AP credential.

In operation 5030c, the auxiliary device (RC) may activate the NFC read/write mode.

In operation 5040c, the auxiliary device (RC) may read the onboarding payload from the commissionee device (WM) through NFC (NFC connection). According to an embodiment, the auxiliary device (RC) may receive an on-boarding payload read response message including an on-boarding payload from the commissionee device (WM) through an NFC connection configured with the commissionee device (WM). Here, the onboarding payload read response message corresponds to a response message of the onboarding payload read message.

In operation 5050c, the auxiliary device (RC) may determine whether the commissionee device (WM) supports AP pre-connection.

Embodiment A

Embodiment A corresponds to an embodiment in which the auxiliary device directly identifies whether the commissionee device supports AP pre-connection based on AP pre-connection capability field/information included in the onboarding payload of the commissionee device.

In embodiment B, the auxiliary device may determine whether the commissionee device supports the AP pre-connection, based on the AP pre-connection capability information included in the onboarding payload of the commissionee device.

Table 1 above shows an example of the onboarding payload including AP pre-connection capability information.

Referring to Table 1, the AP pre-connection capability information may indicate whether the device supports AP pre-connection before commissioning. For example, the AP pre-connection capability information may be set to a first value (e.g., 0) indicating that the device does not support AP pre-connection before commissioning or a second value (e.g., 1) indicating that the device supports AP pre-connection before commissioning.

As described above, when the onboarding payload of the commissionee device includes information/field explicitly indicating whether the commissionee device supports AP pre-connection, the auxiliary device may determine whether the commissionee device supports AP pre-connection based on the value of the information.

Embodiment B

Embodiment B corresponds to an embodiment in which the auxiliary device identifies whether the commissionee device supports AP pre-connection based on information included in a manufacturer-specific element included in the TLV data field/information of the onboarding payload. Embodiment B corresponds to an embodiment in which AP pre-connection capability related information is included as a sub element/information of the manufacturer-specific element that is an onboarding payload element, unlike embodiment A in which AP pre-connection capability related information is included as an onboarding payload element of an onboarding payload.

As shown in Table 1, the onboarding payload may include TLV data information, and the TLV data information may include the manufacturer-specific element. In this case, the manufacturer-specific element may include various types of data/information that may be designated/specified by the manufacturer. For example, information (AP pre-connection capability related information) used to determine whether the commissionee device supports AP pre-connection may be included in the manufacturer-specific element. As an embodiment, the AP pre-connection capability related information may be the AP pre-connection capability information of Table 1, but is not limited thereto.

In this case, the auxiliary device may determine whether the commissionee device supports the AP pre-connection based on the AP pre-connection capability information included in the manufacturer-specific element.

When the commissionee device supports AP pre-connection, in operation 5060c, the auxiliary device (RC) may transfer the temporal AP credential to the commissionee device (WM).

If the commissionee device does not support AP pre-connection, it is moved to operation 5070c.

In operation 5070c, the auxiliary device (RC) may transfer the onboarding payload of the commissionee device (WM) to the commissioner device (TV).

Figure 6:
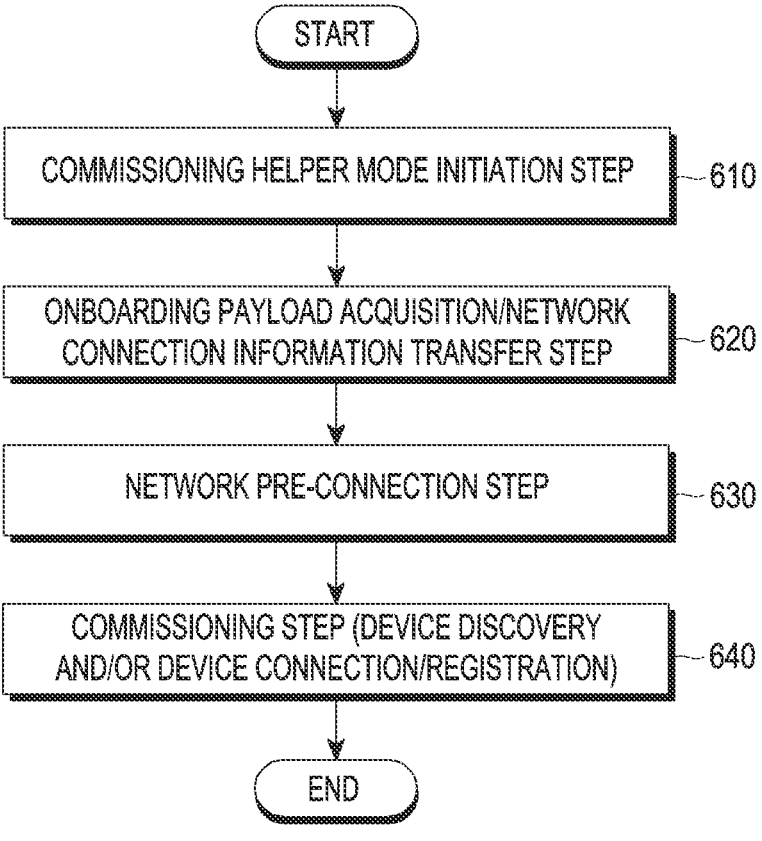
FIG. 6 illustrates an initial connection method of a commissioning device using an auxiliary device, according to a second embodiment of the disclosure.

Embodiment 2 (Embodiment of FIGS. 6 to 8)

Embodiment 1 corresponds to an embodiment in which, before performing a device connection/registration procedure for commissioning, a commissioner device (commissioner) obtains basic information about a commissionee device (commissionee) using an auxiliary device and transfers network connection information (e.g., an AP credential) to the commissionee device, thereby pre-connecting the commissionee device to a network. In embodiment 2, unlike Embodiment 1, which uses temporal network connection information, network connection information is used for commissioning. Embodiment 2 may be applied when the AP does not support a function for temporal network connection information (e.g., per-device AP credentials).

Hereinafter, embodiment 2 is exemplarily described with reference to FIGS. 6 to 8.

FIG. 6 illustrates an initial connection method of a commissioning device using an auxiliary device, according to a second embodiment of the disclosure.

The initial connection method of the second embodiment of FIG. 6 corresponds to a procedure performed by a commissioner device (first electronic device), a commissionee device (second electronic device), a commissioning auxiliary device (assistant device), and/or an AP (AP device).

As described above, in the second embodiment, unlike the first embodiment described above, network connection information, rather than the temporal network connection information, is used as network information. Hereinafter, embodiments are described assuming that the network connection information is an AP credential including a service set identifier (SSID) and/or a password for all the devices connected to the AP, but embodiments are not limited thereto.

Referring to FIG. 6, the initial connection method may include a commissioning helper mode initiation step 610, an onboarding payload acquisition/network connection information transfer step 620, a network pre-connection step 630, and/or a commissioning step 640. According to an embodiment, some steps may be omitted, additional steps may be further performed, or steps may be performed in a different order from the disclosed order.

Step 610 may be a step for allowing the commissioner device to operate the auxiliary device as a commissioning helper. In other words, step 610 may be a step of initiating the commissioning helper mode of the auxiliary device. As an embodiment, the commissioning helper mode may be an NFC-based commissioning helper mode (NFC commissioning helper mode). An example of step 610 is described below with reference to step 710 of FIG. 7.

Step 620 may be a step in which the commissioner device transfers network connection information (AP credential) to the commissionee device through the auxiliary device, and obtains an onboarding payload from the commissionee device. According to an embodiment, the auxiliary device may transfer network connection information (AP credential) to the commissionee device through NFC (NFC connection) and obtain an onboarding payload from the commissionee device.

As an embodiment, the onboarding payload may include information associated with AP pre-connection capability for the commissionee device WM. In an embodiment, the information associated with the AP pre-connection capability may include information explicitly or implicitly indicating whether the commissionee device WM supports the AP pre-connection (AP pre-connection function). An example of step 620 is described below with reference to step 720 of FIG. 7.

Step 630 may be a step for the commissionee device to be pre-connected to the network AP using the network connection information. Here, the pre-connection may mean that the commissionee device is connected to the AP before commissioning. An example of step 630 is described below with reference to step 730 of FIG. 7.

Step 640 may be a step including a device discovery procedure and a device connection/registration procedure for commissioning. The device discovery procedure of step 640 may correspond to procedure 220 of FIG. 2, and the onboarding process of step 640 may correspond to procedure 240 of FIG. 2. However, in step 640, since the commissionee device is pre-connected to the AP, a DSN-SD discovery method may be used instead of the Soft-AP and BLE discovery methods for device discovery. An example of step 640 is described below with reference to step 640 of FIG. 7.

Figure 7A:
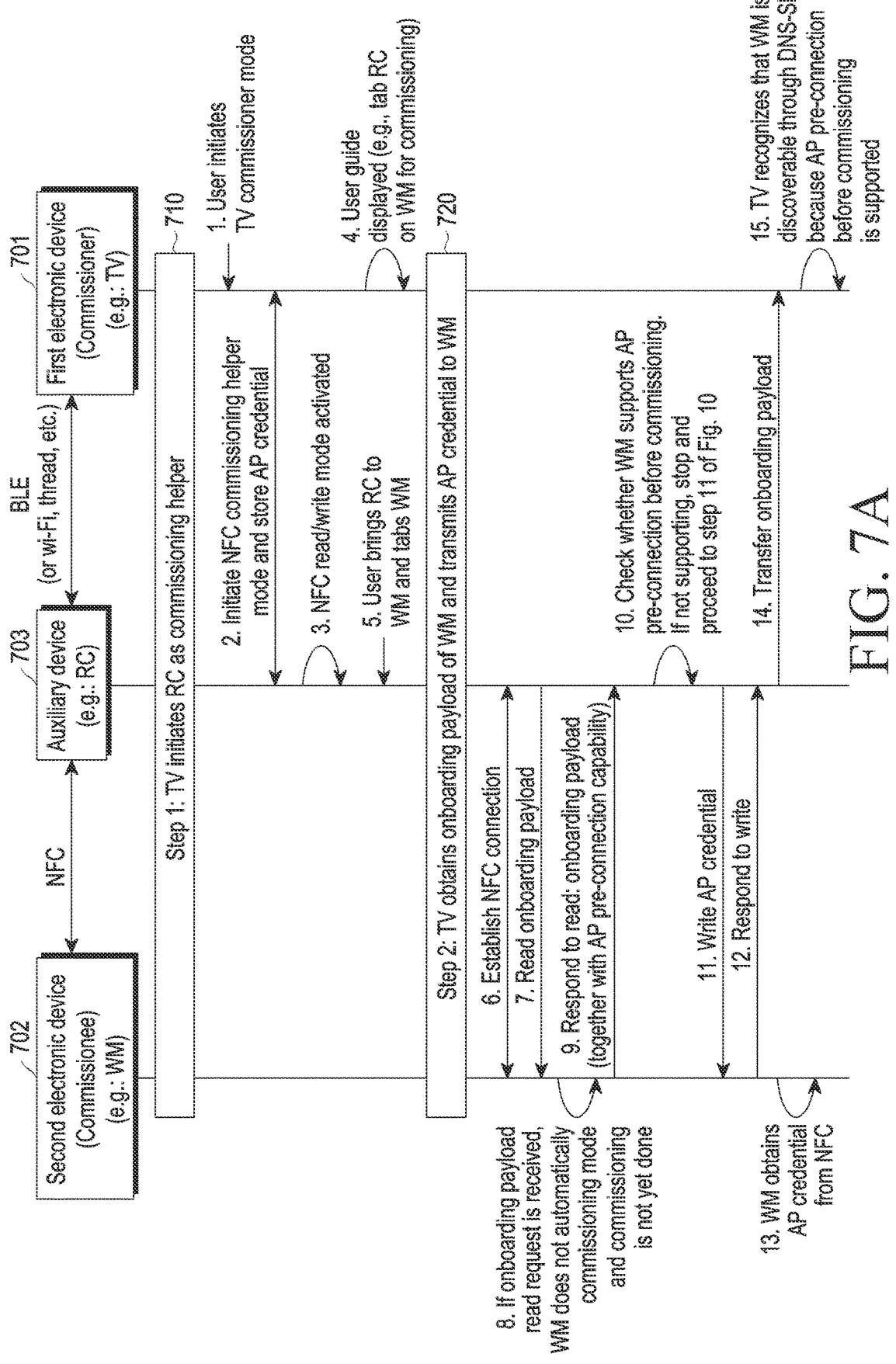
FIGS. 7A and 7B illustrate an example of an initial connection method of a commissioning device using an auxiliary device according to the second embodiment of the disclosure.
Figure 7B:
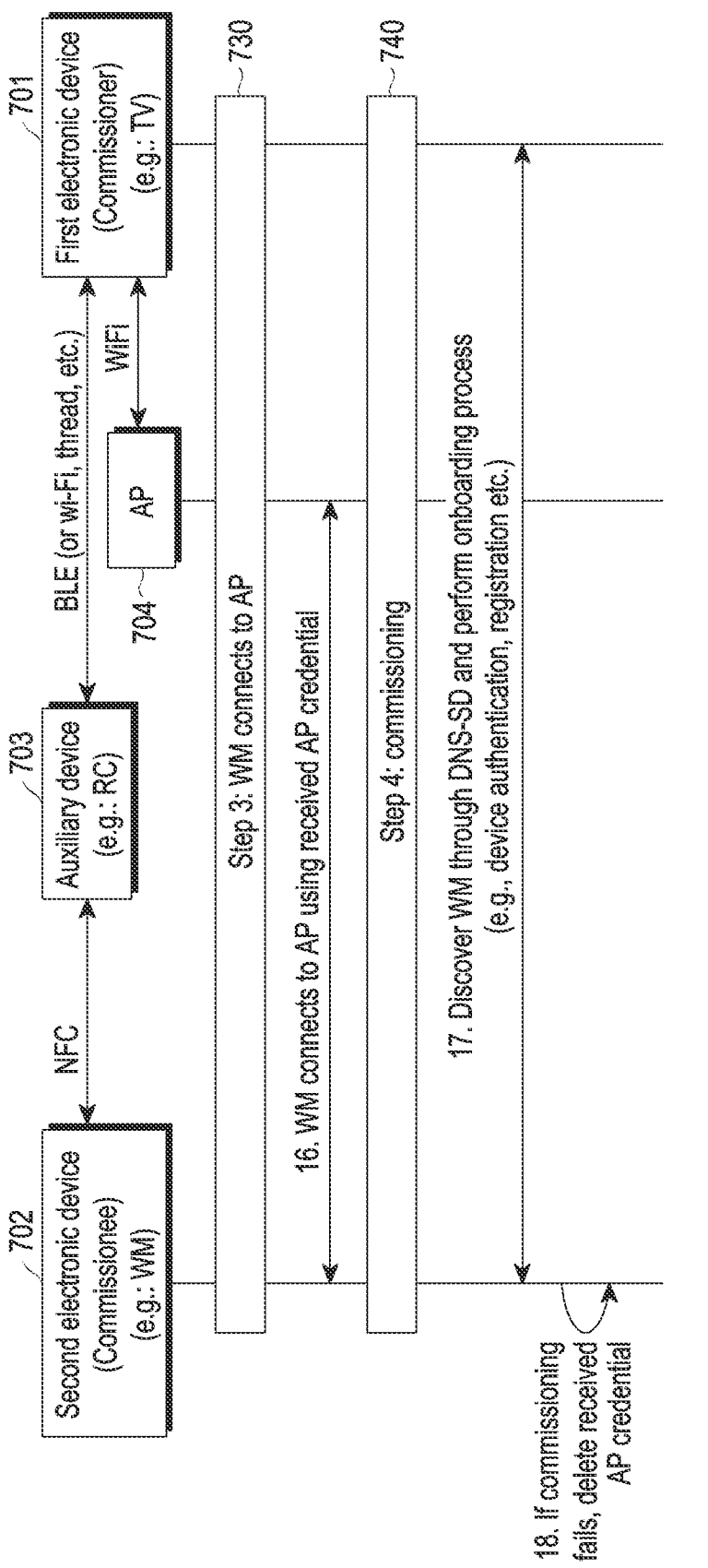

FIGS. 7A and 7B illustrate an example of an initial connection method of a commissioning device using an auxiliary device according to the second embodiment of the disclosure.

In the embodiment of FIGS. 7A and 7B, a TV is described as an example of a first electronic device (a commissioner device) 701, a WM is described as an example of a second electronic device (a commissionee device) 702, and an RC is described as an example of an auxiliary device 703, but the embodiment is not limited thereto as described above.

In the embodiment of FIGS. 7A and 7B, it is exemplified that the commissioner device 701 communicates with the AP 704 via Wi-Fi, the commissioner device 701 communicates with the auxiliary device 703 via BLE (or Wi-Fi, thread), and the auxiliary device 703 communicates with the second electronic device 702 via NFC, but the disclosure is not limited thereto.

As described above, in the second embodiment, unlike the first embodiment described above, network connection information, rather than the temporal network connection information, is used as network information. Hereinafter, embodiments are described assuming that the network connection information is an AP credential including an SSID and/or a password for all the devices connected to the AP, but embodiments are not limited thereto.

<Commissioning Helper Mode Initiation Step (Step 710)>

Step 710 of FIG. 7A may be a step for allowing the commissioner device TV 701 to operate the auxiliary device (RC) 703 as a commissioning helper. In other words, step 710 may be a step of initiating the commissioning helper mode of the auxiliary device (RC) 703. As an embodiment, the commissioning helper mode may be an NFC-based commissioning helper mode (NFC commissioning helper mode).

As an embodiment, the auxiliary device (RC) 703 may be previously connected to the commissioner device TV 701 through a predefined communication scheme. As an embodiment, the predefined communication scheme may be BLE, Wi-Fi, or thread.

Step 710 may include at least one of the following operations/procedures. According to an embodiment, some operations/procedures of step 710 may be omitted, additional operations/procedures may be further performed, or operations/procedures may be performed in a different order from the disclosed order.

Operation 1: Operation 1 may be an operation of starting a commissioner mode (TV commissioner mode) of the commissioner device (TV) 701. In operation 1, the commissioner mode of the commissioner device (TV) 701 may be initiated by a user input. When the commissioner mode is started, the commissioner device (TV) 701 may start an operation for commissioning as a commissioner.

Operation 2: Operation 2 may be an operation in which the commissioner device TV 701 transmits, to the auxiliary device (RC) 703, a request (initiation request) for allowing the auxiliary device (RC) 703 to initiate a commissioning helper mode (NFC commissioning helper mode) and/or a request (storage request) for storing an AP credential. As an embodiment, the initiation request and the storage request may be transmitted as one request.

Operation 3: Operation 3 may be an operation in which the auxiliary device (RC) 703 activates the NFC read/write mode. As an embodiment, in response to the request to initiate and/or store operation 2, the auxiliary device (RC) 703 may activate the NFC Read/Write mode (NFC communication function).

Operation 4: Operation 4 may be an operation in which the commissioner device (TV) 701 displays a user guide for commissioning. For example, the commissioner device (TV) 701 may display a user guide to tab the auxiliary device (RC) 703 on the commissionee device (WM) 702 for commissioning.

Operation 5: Operation 5 may be an operation applied to the auxiliary device (RC) 703 according to the user guide of operation 4. For example, when the user guide is a guide to tab the auxiliary device (RC) 703 on the commissionee device (WM) 702 for commissioning, the user may tap the auxiliary device (RC) 703 on the commissionee device (WM) 702. Accordingly, the user's intention for commissioning may be transferred to the commissionee device (WM) 702.

<Onboarding Payload Acquisition/Network Connection Information Transfer Step (Step 720)>

Step 720 of FIG. 7A may be an operation in which the commissioner device (TV) 701 transfers network connection information (AP credential) to the commissionee device (WM) 702 through the auxiliary device (RC) 703 and obtains an onboarding payload from the commissionee device (WM) 702.

Step 720 may include at least one of the following operations/procedures. According to an embodiment, some operations/procedures of step 720 may be omitted, additional operations/procedures may be further performed, or operations/procedures may be performed in a different order from the disclosed order.

Operation 6: Operation 6 may be an operation in which an NFC connection is established between the auxiliary device (RC) 703 and the commissionee device (WM) 702. The NFC connection establishment operation of operation 6 may be initiated when operation 5 is successfully performed. For example, when the auxiliary device (RC) 703 is normally tabbed on the commissionee device (WM) 702 according to the user guide, the NFC connection establishment operation of operation 6 may be started. The so established NFC connection may be used for subsequent communication/operation between the auxiliary device (RC) 703 and the commissionee device (WM) 702.

Operation 7: Operation 7 may be an operation in which the auxiliary device (RC) 703 transmits a request for reading an onboarding payload ("Read Onboarding payload" request) to the commissionee device (WM) 702 through an NFC connection. The request of operation 7 may be referred to as an onboarding payload read request. As an embodiment, the onboarding payload read request may be included in a message (e.g., an "onboarding payload read" message) and transmitted.

Operation 8: Operation 8 may be an operation in which the commissionee device (WM) 702 enters the commissioning mode. In an embodiment, when the onboarding payload read request is received and the commissioning has not yet been performed, the commissionee device (WM) 702 may automatically enter the commissioning mode. In this case, the commissionee device (WM) 702 may perform a preset operation for commissioning as the commissionee.

Operation 9: Operation 9 may be an operation in which the auxiliary device (RC) 703 receives a response (a read response (Read rep)) corresponding to the onboarding payload read request from the commissionee device (WM) 702 through the NFC connection. As an embodiment, the read response may include an onboarding payload. As an embodiment, the onboarding payload may include information associated with AP pre-connection capability for the commissionee device (WM) 702. In an embodiment, the information associated with the AP pre-connection capability may include information explicitly or implicitly indicating whether the commissionee device (WM) 402 supports the AP pre-connection (AP pre-connection function).

Operation 10: Operation 10 may be an operation in which the auxiliary device (RC) 703 identifies whether the commissionee device (WM) 702 supports AP pre-connection before commissioning, based on the on-boarding payload. When the commissionee device (WM) 702 supports AP pre-connection, operation 11 may be performed. When the commissionee device (WM) 702 does not support AP pre-connection, the second embodiment of FIG. 7 may be terminated, and operation 11 of the third embodiment of FIG. 10, described above, may be performed. As described above, when the commissionee device (WM) 402 does not support the AP pre-connection, the method of the second embodiment based on the pre-connection may not be performed, and the commissioning should be performed in the same manner as the method of the third embodiment.

Operation 11: Operation 11 may be an operation in which the auxiliary device (RC) 703 transmits a "Write AP credential" request for writing an AP credential to the commissionee device (WM) 702. The request of operation 11 may be referred to as an AP credential write request. As an embodiment, the AP credential write request may include an AP credential. As an embodiment, the AP credential may be stored in the NFC of the commissionee device (WM) 702 by the AP credential write request.

Operation 12: Operation 12 may be an operation in which the auxiliary device (RC) 703 receives a response (Write rep) corresponding to the AP credential write request from the commissionee device (WM) 702.

Operation 13: Operation 13 may be an operation in which the commissionee device (WM) 702 obtains an AP credential. As an embodiment, the commissionee device (WM) 702 may obtain the AP credential from the AP credential write request. In an embodiment, by the AP credential write request in operation 11, the AP credential may be stored in the NFC of the commissionee device (WM) 702, and the commissionee device (WM) 702 (or the processor/controller of the commissionee device (WM) 702) may read and obtain the AP credential from the NFC.

Operation 14: Operation 14 may be an operation in which the auxiliary device (RC) 703 transfers the onboarding payload to the commissioner device (TV) 701.

Operation 15: Operation 15 may be an operation in which the commissioner device (TV) 701 recognizes/identifies that the commissionee device (WM) 702 is discoverable through DNS-SD, because the commissionee device (WM) 702 supports AP pre-connection before commissioning. As an embodiment, the commissioner device (TV) 701 may identify that the commissionee device (WM) 702 supports AP pre-connection before commissioning, based on the information included in the onboarding payload.

<Network Pre-Connection Step (Step 730)>

Step 730 may be a step in which the commissionee device (WM) 702 is pre-connected to the network AP 704 using network connection information (AP credential).

Step 730 may include at least one of the following operations/procedures. According to an embodiment, some operations/procedures of step 730 may be omitted, additional operations/procedures may be further performed, or operations/procedures may be performed in a different order from the disclosed order.

Operation 16: Operation 16 may be an operation in which the commissionee device (WM) 702 connects to the AP 404 using the AP credential. The commissionee device (WM) 702 may be pre-connected to the AP 704 by performing a predefined connection procedure using an AP credential.

<Commissioning Step (Step 740)>

Step 740 may be an operation including a device discovery procedure and a device connection/registration procedure for commissioning.

Step 740 may include at least one of the following operations/procedures. According to an embodiment, some operations/procedures of step 740 may be omitted, additional operations/procedures may be further performed, or operations/procedures may be performed in a different order from the disclosed order.

Operation 17: Operation 17 may be an operation including a device discovery procedure and an onboarding process through DSN-SD performed between the commissioner device (TV) 701 and the commissionee device (WD) 702. The device discovery procedure of operation 17 may correspond to procedure 220 of FIG. 2, and the onboarding process of operation 17 may correspond to procedure 240 of FIG. 2. However, in operation 17, a DSN-SD discovery method is used rather than a Soft-AP and BLE discovery method for device discovery.

Operation 18: Operation 18 may be an operation of deleting network connection information (AP credential) when the commissioning of the commissionee device (WD) 702 fails.

The second embodiment of the initial connection procedure of the commissioning device using the above-described auxiliary device may have the following benefits.

(1) UX Perspective (Better UX)

In the second embodiment, since the onboarding payload may be obtained through NFC, the user does not need to passively input an 11- or 12-digit numeric code (pass code) through the auxiliary device 703.

In the second embodiment, by the tab operation of the auxiliary device (RC) 703, the commissionee device (WD) 702 may identify the user intent for the commissioning and may automatically start the commissioning mode. Accordingly, the commissioning mode of the commissionee device (WD) 702 may be easily triggered.

In the second embodiment, since the AP pre-connection through the AP credential is performed, the discovery procedure of the DSN-SD method may be used without using the Soft-AP method. Therefore, unlike the case of using the Soft-AP method that causes disconnection of the streaming service of the commissioner device (TV) 401 during the commissioning, the streaming service may not be disconnected during the commissioning procedure.

(2) Implementation Perspective (Low Implementation Burden)

In the second embodiment, since a simple device such as an RC may be used as the auxiliary device 703, the commissioner device (TV) 701 does not need to rely on a smartphone (or a smartphone application) for commissioning.

In the second embodiment, the commissionee device (WM) 702 does not need to implement discovery of other devices such as soft-AP or BLE other than discovery of DSN-SD.

(3) Efficiency Perspective

In the second embodiment, the device discovery time may be reduced by limiting the discovery channel to DNS-SD.

(4) Easy Deploy

In the second embodiment, it may be deployed regardless of the function of the AP (e.g., whether the per-device AP credential function is supported).

Figure 8A:
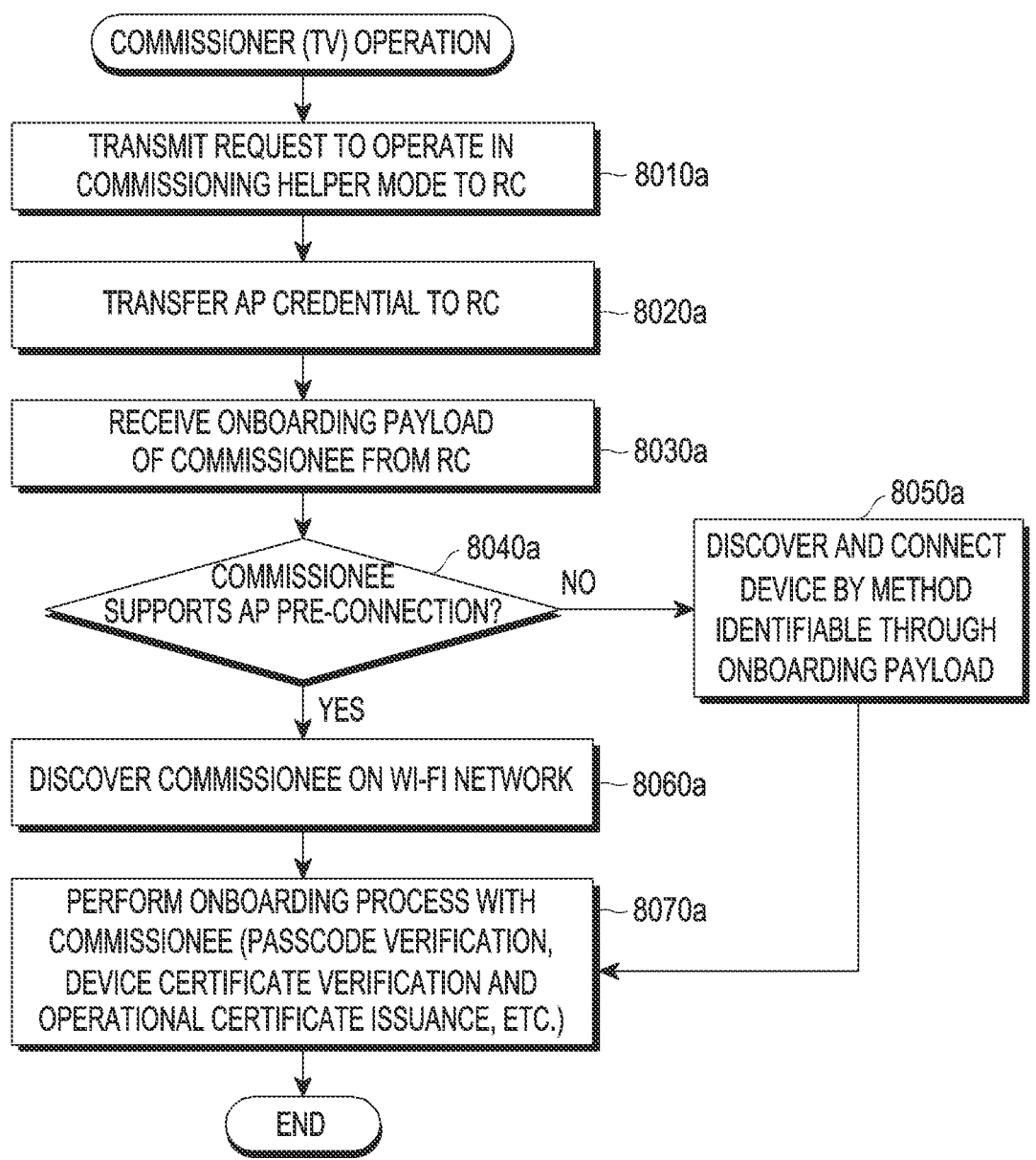
FIG. 8A illustrates an operation of a commissioner device performing an initial connection method of a commissioning device using an auxiliary device according to the second embodiment of the disclosure.

FIG. 8A illustrates an operation of a commissioner device performing an initial connection method of a commissioning device using an auxiliary device according to the second embodiment of the disclosure.

In the embodiment of FIG. 8A, a TV is described as an example of a commissioner device, a WM is described as an example of a commissionee device, an RC is described as an example of an auxiliary device, and a Wi-Fi device (network) is described as an example of an AP device (network), but embodiments are not limited thereto as described above.

Further, the embodiment of FIG. 8A illustrates that the commissioner device TV communicates with the AP through Wi-Fi, the commissioner device TV communicates with the auxiliary device (RC) through BLE (or Wi-Fi, thread), and the auxiliary device (RC) communicates with the commissionee device WM through NFC, but embodiments are not limited thereto.

As described above, in the second embodiment, unlike the first embodiment described above, network connection information, rather than the temporal network connection information, is used as network information. Hereinafter, embodiments are described assuming that the network connection information is an AP credential including an SSID and/or a password for all the devices connected to the AP, but embodiments are not limited thereto.

Referring to FIG. 8A, in operation 8010a, the commissioner device (TV) may transmit a request for allowing the auxiliary device (RC) to operate in the commissioning helper mode to the auxiliary device (RC).

In operation 8020a, the commissioner device (TV) may transfer the AP credential to the auxiliary device (RC). Meanwhile, according to an embodiment, the AP credential may be included in the request of operation 8010a and transmitted. In this case, operation 8010a and operation 8020a may be performed as one operation.

In operation 8030a, the commissioner device (TV) may receive an onboarding payload of the commissionee device (WM) from the auxiliary device (RC).

In operation 8040a, the commissioner device (TV) may determine whether the commissionee device (WM) supports AP pre-connection.

Embodiment A

Embodiment A corresponds to an embodiment in which the commissioner device (TV) directly identifies whether the commissionee device (WM) supports AP pre-connection based on the AP pre-connection capability field/information included in the onboarding payload of the commissionee device (WM).

In embodiment A, the commissioner device (TV) may determine whether the commissionee device (WM) supports AP pre-connection, based on the AP pre-connection capability information included in the onboarding payload of the commissionee device (WM).

Table 1 above shows an example of the onboarding payload including AP pre-connection capability information.

Referring to Table 1, the AP pre-connection capability information may indicate whether a device (a commissionee device) supports AP pre-connection before commissioning. For example, the AP pre-connection capability information may be set to a first value (e.g., 0) indicating that the device does not support AP pre-connection before commissioning or a second value (e.g., 1) indicating that the device supports AP pre-connection before commissioning.

As described above, when the onboarding payload of the commissionee device (WM) includes information/field explicitly indicating whether the commissionee device (WM) supports AP pre-connection, the commissioner device (TV) may determine whether the commissionee device (WM) supports AP pre-connection based on the value of the information.

Embodiment B

Embodiment B corresponds to an embodiment in which the commissioner device (TV) identifies whether the commissionee device (WM) supports AP pre-connection based on information included in a manufacturer-specific element included in the TLV data field/information of the onboarding payload. Embodiment B corresponds to an embodiment in which AP pre-connection capability related information is included as a sub element/information of the manufacturer-specific element that is an onboarding payload element, unlike embodiment A in which AP pre-connection capability related information is included as an onboarding payload element of an onboarding payload.

As shown in Table 1, the onboarding payload may include TLV data information, and the TLV data information may include the manufacturer-specific element. In this case, the manufacturer-specific element may include various types of data/information that may be designated/specified by the manufacturer. For example, information (AP pre-connection capability related information) used to determine whether the commissionee device (WM) supports AP pre-connection may be included in the manufacturer-specific element. As an embodiment, the AP pre-connection capability related information may be the AP pre-connection capability information of Table 1, but is not limited thereto.

In this case, the commissioner device (TV) may determine whether the commissionee device (WM) supports the AP pre-connection based on the AP pre-connection capability information included in the manufacturer-specific element.

Embodiment C

Embodiment C corresponds to an embodiment of directly identifying whether the commissionee device (WM) supports AP pre-connection based on device information in the onboarding payload. Embodiment C corresponds to an embodiment in which AP pre-connection capability related information is not explicitly included in the onboarding payload, unlike embodiment A/B.

As shown in Table 1, the onboarding payload may include device information such as a vendor ID field/information and a product ID field/information.

In this case, the commissioner device (TV) may obtain the performance information about the corresponding device from an associated server (e.g., a distributed server that provides the device information about the corresponding device) using the device information included in the onboarding payload. For example, the commissioner device (TV) may request the performance information about the corresponding device from the associated server using the device information included in the onboarding payload, and may receive the performance information from the corresponding server.

The performance information about the corresponding device received/obtained from the server may include information (AP pre-connection capability related information) used to determine whether the commissionee device (WM) supports AP pre-connection. As an embodiment, the AP pre-connection capability related information may be the AP pre-connection capability information of Table 1, but is not limited thereto.

When the commissionee device (WM) does not support AP pre-connection, it moves to operation 8050a.

In operation 8050a, the commissioner device (TV) may perform an operation/procedure for discovering the commissionee device (WM) using the discovery method identified based on the onboarding payload. For example, the commissioner device (TV) may perform an operation/procedure for discovering the commissionee device (WM) using any one of the DSN-SD, BLE, and Soft-AP discovery methods, based on the on-boarding payload. For example, the commissioner device (TV) may perform an operation/procedure for discovering the commissionee device (WM) while circulating the DSN-SD, BLE, and Soft-AP discovery methods.

When the commissionee device (WM) supports AP pre-connection, it moves to operation 8060a.

In operation 8060a, the commissioner device (TV) may perform an operation/procedure for discovering the commissionee device (WM) using the DSN-SD discovery method.

Embodiment A

In this embodiment, the commissioner device (TV) may directly/immediately perform an operation for discovering the commissionee device (WM) on an AP network (e.g., a Wi-Fi network) for a preset period. As such, In embodiment A, unlike embodiment B/C to be described below, in which the operation of discovering the commissionee device (WM) is initiated by a notification/request of another device, the operation of discovering the commissionee device (WM) may be directly initiated by the commissioner device (TV).

Embodiment B

In this embodiment, when the commissioner device (TV) receives a notification indicating that the commissionee device (WM) has joined an AP network (e.g., a Wi-Fi network) from the auxiliary device (RC), the commissioner device (TV) may perform an operation for discovering the commissionee device (WM) on the AP network.

Embodiment C

In this embodiment, when the commissioning request is received from the commissionee device (WM) joining the AP network (e.g., Wi-Fi network), the commissioner device (TV) may perform an operation for discovering the commissionee device (WM) on the AP network. As an embodiment, this commissioning request may be performed using, e.g., the user directed commissioning protocol of the matter standard of the connectivity standards alliance (CAS).

In operation 8070a, the commissioner device (TV) may perform an onboarding process with the commissionee device (WM). As an embodiment, the onboarding process may include the above-described device verification operation and/or device connection/registration operation. Accordingly, the commissionee device (WM) may be connected/registered to an IoT platform (or a smart home network).

Figure 8B:
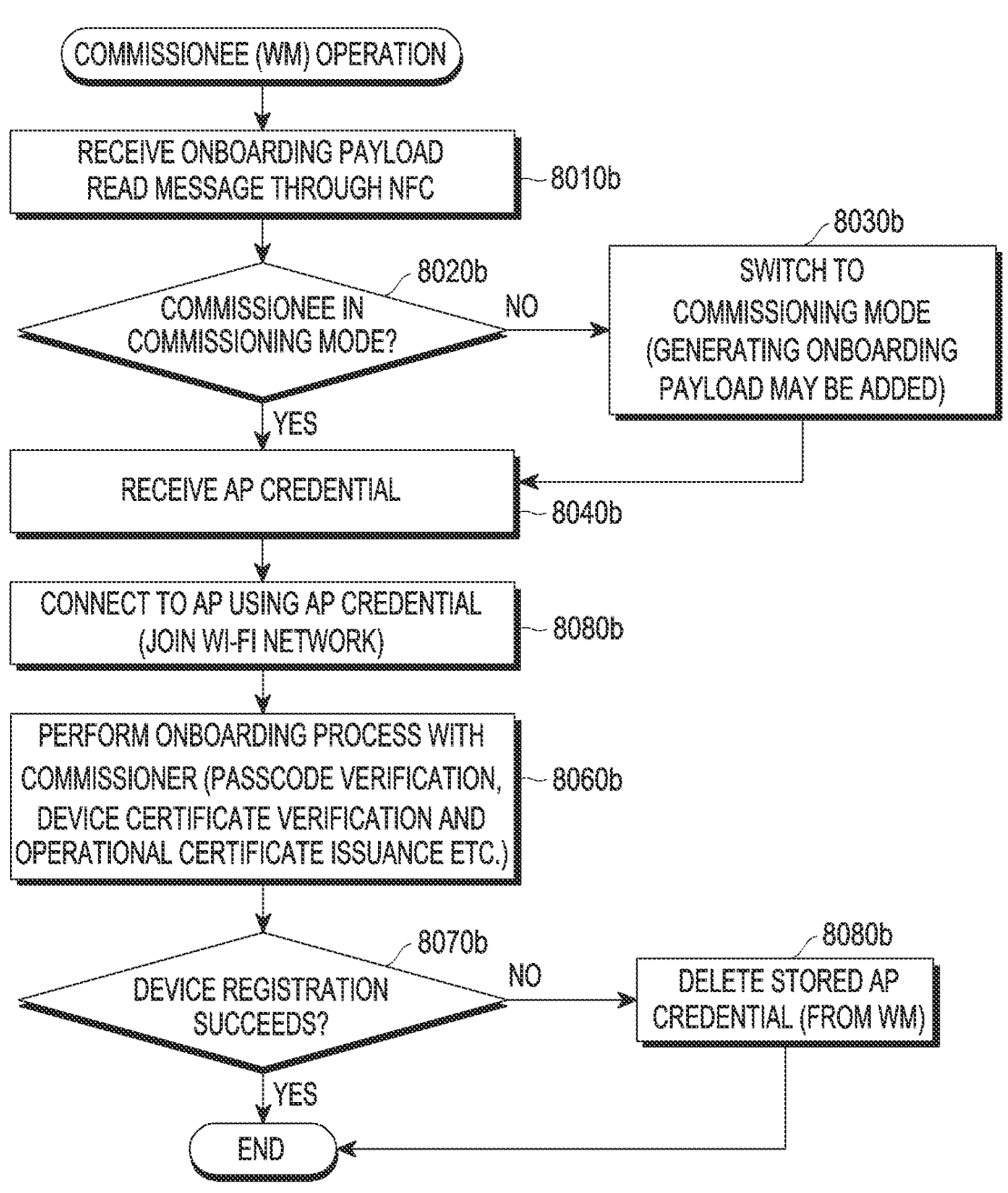
FIG. 8B exemplarily illustrates an operation of a commissionee device performing an initial connection method of a commissioning device using an auxiliary device according to the second embodiment of the disclosure.

FIG. 8B exemplarily illustrates an operation of a commissionee device performing an initial connection method of a commissioning device using an auxiliary device according to the second embodiment of the disclosure.

In the embodiment of FIG. 8B, a TV is described as an example of the commissioner device, a WM is described as an example of the commissionee device, an RC is described as an example of the auxiliary device, and a Wi-Fi device (network) is described as an example of the AP device (network), but embodiments are not limited thereto as described above.

Further, the embodiment of FIG. 8B illustrates that the commissioner device (TV) communicates with the AP via Wi-Fi, the commissioner device (TV) communicates with the auxiliary device (RC) via BLE (or Wi-Fi, thread), and the auxiliary device (RC) communicates with the commissionee device (WM) via NFC, but embodiments are not limited thereto.

As described above, in the second embodiment, unlike the first embodiment described above, network connection information, rather than the temporal network connection information, is used as network information. Hereinafter, embodiments are described assuming that the network connection information is an AP credential including an SSID and/or a password for all the devices connected to the AP, but embodiments are not limited thereto.

Referring to FIG. 8B, in operation 8010b, the commissionee device (WM) may receive an onboarding payload read message through NFC (NFC connection). According to an embodiment, the commissionee device (WM) may receive an onboarding payload read message from the auxiliary device (RC) through an NFC connection configured with the auxiliary device (RC). As an embodiment, the onboarding payload read message may include the onboarding payload read request described with reference to FIG. 7.

In operation 8020b, the commissionee device (WM) may determine whether the commissionee device (WM) is in the commissioning mode.

When the commissionee device (WM) is not in the commissioning mode, in operation 8030b, the commissionee device (WM) may switch the operation mode to the commissioning mode. If necessary, in operation 8030b, the commissionee device (WM) may further perform an operation of generating an onboarding payload.

When the commissionee device (WM) is in the commissioning mode, in operation 8040b, the commissionee device (WM) may receive an AP credential. According to an embodiment, the commissionee device (WM) may receive an AP credential from the auxiliary device (RC) through an NFC connection configured with the auxiliary device (RC).

In operation 8050b, the commissionee device (WM) may connect to the AP using the AP credential. Accordingly, the commissionee device (WM) may be joined/pre-connected to the AP network (Wi-Fi network).

In operation 8060b, the commissionee device (WM) may perform an onboarding process with the commissioner device (TV). As an embodiment, the onboarding process may include the above-described device verification operation and/or device connection/registration operation. Accordingly, the commissionee device (WM) may be connected to an IoT platform (or a smart home network).

In operation 8070b, the commissionee device (WM) may identify whether device registration is successful.

If device registration is not successful, in operation 8080b, the commissionee device (WM) may delete the stored AP credential.

Figure 9:
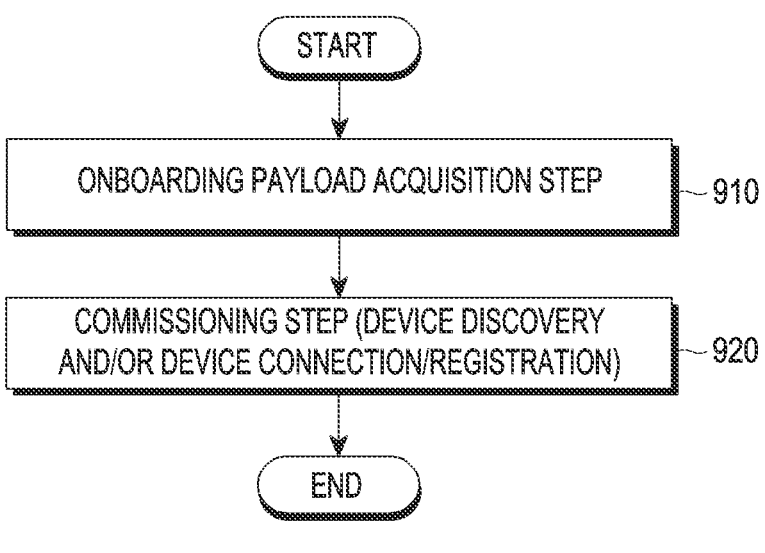
FIG. 9 illustrates an initial connection method of a commissioning device using an auxiliary device, according to a third embodiment of the disclosure.
Figure 10:
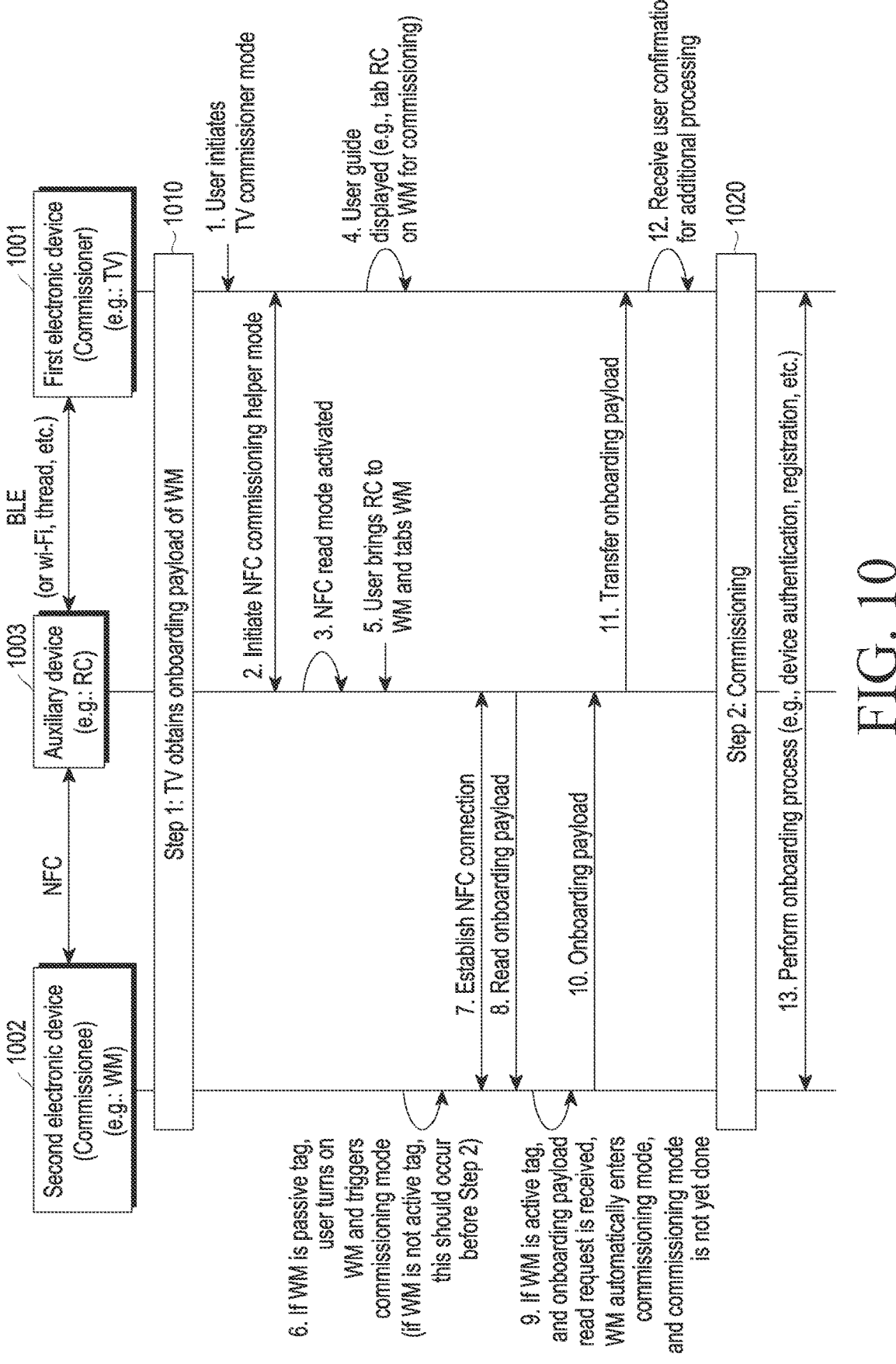
FIG. 10 illustrates an example of an initial connection method of a commissioning device using an auxiliary device, according to the third embodiment of the disclosure.

Embodiment 3 (Embodiment of FIGS. 9 to 11)

In Embodiments 1 and 2, in order for the commissionee device to support pre-connection to the AP, the NFC tag of the commissionee device should not be simply in the form of a passive tag, but should be in the form of an active tag that is programmable and interworks with the system of the commissionee device. However, some commissionee devices may not support the function of an active tag directly interworking with such a commissionee device, but may simply have a form of attaching a passive tag. In this case, the initial connection procedures of embodiments 1 and 2 supporting the pre-connection may not be performed.

Therefore, there is a need for a method for easily obtaining an onboarding payload using an auxiliary device even for a commissioner device having a simple passive NFC tag attached thereto. Embodiment 3 describes various embodiments for this.

Hereinafter, embodiment 3 is exemplarily described with reference to FIGS. 9 to 11.

FIG. 9 illustrates an initial connection method of a commissioning device using an auxiliary device, according to a third embodiment of the disclosure.

The initial connection method of the third embodiment of FIG. 9 corresponds to a procedure performed by a commissioner device (first electronic device), a commissionee device (second electronic device), a commissioning auxiliary device (assistant device), and/or an AP (AP device).

Referring to FIG. 9. the initial connection method may include an onboarding payload acquisition step 910 and/or a commissioning step 920. According to an embodiment, some steps may be omitted, additional steps may be further performed, or steps may be performed in a different order from the disclosed order.

Step 910 may be a step for allowing the commissioner device to operate the auxiliary device as a commissioning helper and obtaining an onboarding payload from the commissionee device through the auxiliary device.

Step 910 may include a step of initiating the commissioning helper mode of the auxiliary device. As an embodiment, the commissioning helper mode may be an NFC-based commissioning helper mode (NFC commissioning helper mode).

Further, step 910 may include a step of obtaining an onboarding payload from the commissionee device through the auxiliary device by the commissioner device. As an embodiment, the auxiliary device may obtain an onboarding payload from the commissionee device through NFC (NFC connection).

An example of step 910 is described below with reference to step 1010 of FIG. 10.

Step 920 may be an operation including a device discovery procedure and a device connection/registration procedure for commissioning. The device discovery-procedure of step 920 may correspond to procedure 220 of FIG. 2, and the onboarding process of step 920 may correspond to procedure 240 of FIG. 2. An example of step 920 is described below with reference to step 1020 of FIG. 10.

FIG. 10 illustrates an example of an initial connection method of a commissioning device using an auxiliary device, according to the third embodiment of the disclosure.

In the embodiment of FIG. 10, a TV is described as an example of a first electronic device (a commissioner device) 1001, a WM is described as an example of a second electronic device (a commissionee device) 1002, and an RC is described as an example of an auxiliary device 1003, but the embodiment is not limited thereto as described above.

Further, the embodiment of FIG. 10 illustrates that the commissioner device 1001 communicates with the AP through Wi-Fi, the commissioner device 1001 communicates with the auxiliary device 1003 through BLE (or Wi-Fi, thread), and the auxiliary device 1003 communicates with the commissionee device 1002 through NFC, but embodiments are not limited thereto.

<Onboarding Payload Acquisition Step (Step 1010)>

Step 1010 of FIG. 10 may include a step for allowing the commissioner device TV 1001 to operate the auxiliary device (RC) 1003 as a commissioning helper. In other words, step 1010 may include a step of initiating the commissioning helper mode of the auxiliary device (RC) 1003. As an embodiment, the commissioning helper mode may be an NFC-based commissioning helper mode (NFC commissioning helper mode).

As an embodiment, the auxiliary device (RC) 1003 may be previously connected to the commissioner device TV 1001 through a predefined communication scheme. As an embodiment, the predefined communication scheme may be BLE, Wi-Fi, or thread.

Further, step 1010 of FIG. 10 may include a step in which the commissioner device (TV) 1001 obtains an onboarding payload from the commissionee device (WM) 1002 through the auxiliary device (RC) 1003.

Step 1010 may include at least one of the following operations/procedures. According to an embodiment, some operations/procedures of step 1010 may be omitted, additional operations/procedures may be further performed, or operations/procedures may be performed in a different order from the disclosed order.

Operation 1: Operation 1 may be an operation of starting a commissioner mode (TV commissioner mode) of the commissioner device (TV) 1001. In operation 1, the commissioner mode of the commissioner device (TV) 1001 may be initiated by a user input. When the commissioner mode is started, the commissioner device (TV) 1001 may start an operation for commissioning as a commissioner.

Operation 2: Operation 2 may be an operation in which the commissioner device TV 1001 transmits, to the auxiliary device (RC) 1003, a request (initiation request) for allowing the auxiliary device (RC) 1003 to initiate a commissioning helper mode (NFC commissioning helper mode).

Operation 3: Operation 3 may be an operation in which the auxiliary device (RC) 1003 activates the NFC read/write mode. As an embodiment, in response to the initiation request of operation 10, the auxiliary device (RC) 1003 may activate the NFC Read/Write mode (NFC communication function).

Operation 4: Operation 4 may be an operation in which the commissioner device (TV) 1001 displays a user guide for commissioning. For example, the commissioner device (TV) 1001 may display a user guide to tab the auxiliary device (RC) 1003 on the commissionee device (WM) 1002 for commissioning.

Operation 5: Operation 5 may be an operation applied to the auxiliary device (RC) 1003 according to the user guide of operation 4. For example, when the user guide is a guide to tab the auxiliary device (RC) 1003 on the commissionee device (WM) 1002 for commissioning, the user may tap the auxiliary device (RC) 1003 on the commissionee device (WM) 1002. Accordingly, the user's intention for commissioning may be transferred to the commissionee device (WM) 1002.

Operation 6: Operation 6 may be an operation in which the commissionee device (WM) 1002 is turned on and the commissioning mode is triggered. When the NFC tag provided by the commissionee device (WM) 1002 is a passive tag, operation 6 is performed. When the NFC tag provided by the commissionee device (WM) 1002 is not an active tag, operation 6 should be performed before operation 1020 to be described below.

Operation 7: Operation 7 may be an operation in which an NFC connection is established between the auxiliary device (RC) 1003 and the commissionee device (WM) 1002. The NFC connection establishment operation of operation 7 may be initiated when operation 6 and/or operation 7 is successfully performed. The so established NFC connection may be used for subsequent communication/operation between the auxiliary device (RC) 1003 and the commissionee device (WM) 1002.

Operation 8: Operation 7 may be an operation in which the auxiliary device (RC) 1003 transmits a request for reading an onboarding payload ("Read Onboarding payload" request) to the commissionee device (WM) 1002 through an NFC connection. The request of operation 8 may be referred to as an onboarding payload read request. As an embodiment, the onboarding payload read request may be included in a message (e.g., an "onboarding payload read" message) and transmitted.

Operation 9: Operation 9 may be an operation in which the commissionee device (WM) 1002 enters the commissioning mode. Operation 9 may be performed when the NFC tag provided by the commissionee device (WM) 1002 is an active tag. In an embodiment, if the commissionee device (WM) 1002 supports an active tag, when the onboarding payload read request is received and the commissioning has not yet been performed, the commissionee device (WM) 1002 may automatically enter the commissioning mode. In this case, the commissionee device (WM) 1002 may perform a preset operation for commissioning as the commissionee.

Operation 10: Operation 10 may be an operation in which the auxiliary device (RC) 1003 receives an onboarding payload from the commissionee device (WM) 702 through an NFC connection. As an embodiment, the onboarding payload may be included in a read response corresponding to the onboarding payload read request. As an embodiment, the onboarding payload may include information associated with AP pre-connection capability for the commissionee device (WM) 402. In an embodiment, the information associated with the AP pre-connection capability may include information explicitly or implicitly indicating whether the commissionee device (WM) 402 supports the AP pre-connection (AP pre-connection function).

Operation 11: Operation 11 may be an operation in which the auxiliary device (RC) 1003 transfers the onboarding payload to the commissioner device (TV) 1001.

Operation 12: Operation 12 may be an operation in which the commissioner device (TV) 1001 receives user confirmation for an additional procedure.

<Commissioning Step (Step 1020)>

Step 1020 of FIG. 10 may be an operation including a device discovery procedure and/or a device connection/registration procedure for commissioning.

Step 1020 may include at least one of the following operations/procedures. According to an embodiment, some operations/procedures of step 1020 may be omitted, additional operations/procedures may be further performed, or operations/procedures may be performed in a different order from the disclosed order.

Operation 13: Operation 13 may be an operation including a device discovery procedure and/or an onboarding process performed between the commissioner device (TV) 1001 and the commissionee device (WD) 1002. The device discovery procedure of operation 20 may correspond to procedure 220 of FIG. 2, and the onboarding process of operation 13 may correspond to procedure 240 of FIG. 2.

The second embodiment of the initial connection procedure of the commissioning device using the above-described auxiliary device may have the following benefits.

UX Perspective (Better UX)

In the third embodiment, since the onboarding payload may be obtained through NFC, the user does not need to passively input an 11- or 12-digit numeric code (pass code) through the auxiliary device 1003.

In the third embodiment, by the tab operation of the auxiliary device (RC) 703, the commissionee device (WD) 702 may identify the user intent for the commissioning and may automatically start the commissioning mode. Accordingly, the commissioning mode of the commissionee device (WD) 702 may be easily triggered.

In the case of the third embodiment, AP pre-connection may be performed according to an embodiment. In this case, the discovery procedure of the DSN-SD method may be used without using the Soft-AP method. Therefore, unlike the case of using the Soft-AP method that causes disconnection of the streaming service of the commissioner device (TV) 401 during the commissioning, the streaming service may not be disconnected during the commissioning procedure.

(2) Implementation Perspective (Low Implementation Burden)

In the third embodiment, since a simple device such as an RC may be used as the auxiliary device 703, the commissioner device (TV) 701 does not need to rely on a smartphone (or a smartphone application) for commissioning.

In the third embodiment, when pre-connection is performed, the commissionee device (WM) 402 does not need to implement discovery of other devices such as soft-AP or BLE other than discovery of DSN-SD.

(3) Easy Deploy

In the second embodiment, it may be deployed regardless of the function of the AP.

Figure 11A:
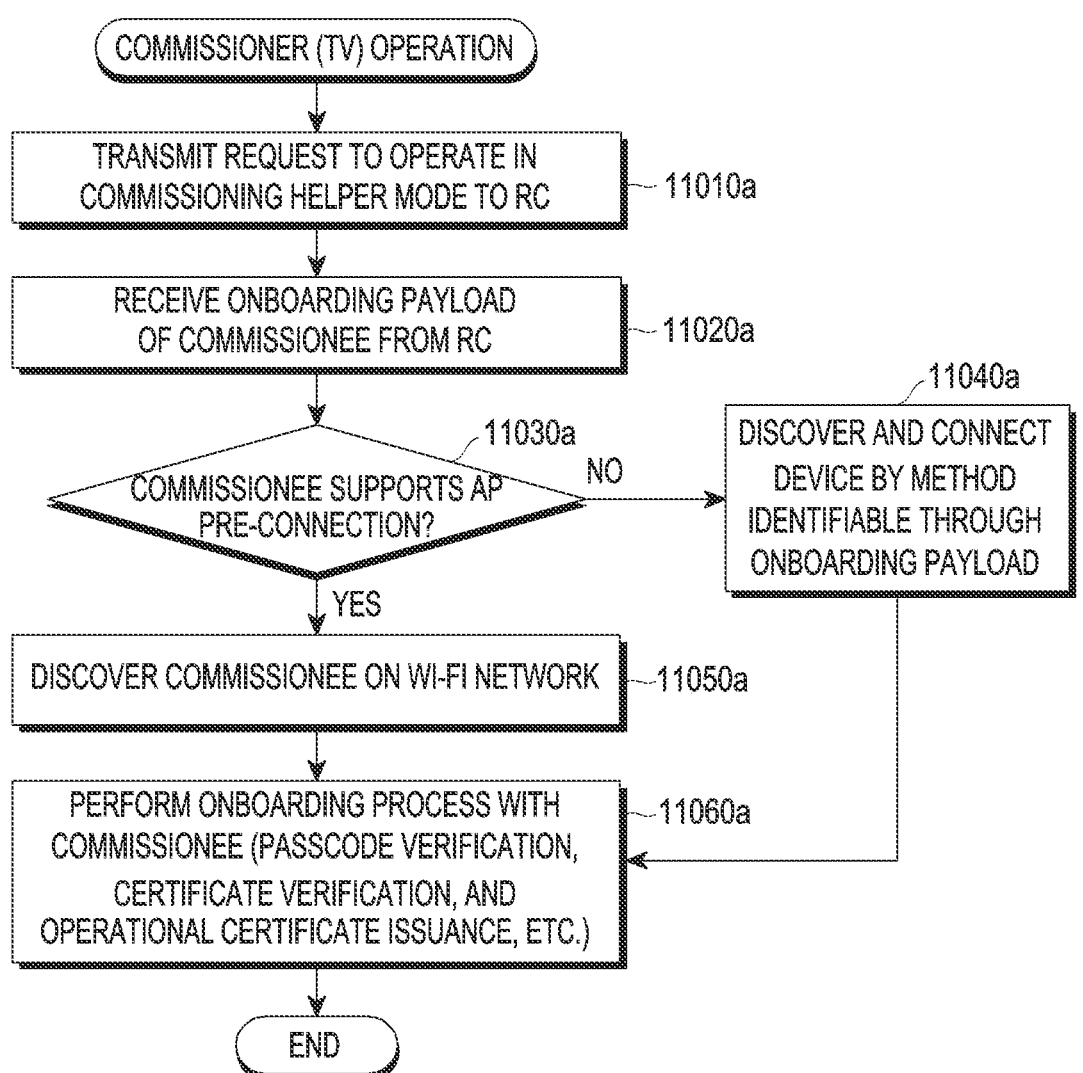
FIG. 11A exemplarily illustrates an operation of a commissioner device performing an initial connection method of a commissioning device using an auxiliary device according to the third embodiment of the disclosure.

FIG. 11A exemplarily illustrates an operation of a commissioner device performing an initial connection method of a commissioning device using an auxiliary device according to the third embodiment of the disclosure.

In the embodiment of FIG. 11A, a TV is described as an example of a commissioner device, a WM is described as an example of a commissionee device, an RC is described as an example of an auxiliary device, and a Wi-Fi device (network) is described as an example of an AP device (network), but embodiments are not limited thereto as described above.

Further, the embodiment of FIG. 11A illustrates that the commissioner device TV communicates with the AP through Wi-Fi, the commissioner device TV communicates with the auxiliary device (RC) through BLE (or Wi-Fi, thread), and the auxiliary device (RC) communicates with the commissionee device WM through NFC, but embodiments are not limited thereto.

Referring to FIG. 11A, in operation 11010*a*, the commissioner device (TV) may transmit a request for allowing the auxiliary device (RC) to operate in the commissioning helper mode to the auxiliary device (RC).

In operation 1120*a*, the commissioner device (TV) may receive an onboarding payload of the commissionee device (WM) from the auxiliary device (RC).

In operation 8030*a*, the commissioner device (TV) may determine whether the commissionee device (WM) supports AP pre-connection.

Embodiment A

Embodiment A corresponds to an embodiment in which the commissioner device (TV) directly identifies whether the commissionee device (WM) supports AP pre-connection based on the AP pre-connection capability field/information included in the onboarding payload of the commissionee device (WM).

In embodiment A, the commissioner device (TV) may determine whether the commissionee device (WM) supports AP pre-connection, based on the AP pre-connection capability information included in the onboarding payload of the commissionee device (WM).

Table 1 above shows an example of the onboarding payload including AP pre-connection capability information.

Referring to Table 1, the AP pre-connection capability information may indicate whether a device (a commissionee device) supports AP pre-connection before commissioning. For example, the AP pre-connection capability information may be set to a first value (e.g., 0) indicating that the device does not support AP pre-connection before commissioning or a second value (e.g., 1) indicating that the device supports AP pre-connection before commissioning.

As described above, when the onboarding payload of the commissionee device (WM) includes information/field explicitly indicating whether the commissionee device (WM) supports AP pre-connection, the commissioner device (TV) may determine whether the commissionee device (WM) supports AP pre-connection based on the value of the information.

Embodiment B

Embodiment B corresponds to an embodiment in which the commissioner device (TV) identifies whether the commissionee device (WM) supports AP pre-connection based on information included in a manufacturer-specific element included in the TLV data field/information of the onboarding payload. Embodiment B corresponds to an embodiment in which AP pre-connection capability related information is included as a sub element/information of the manufacturer-specific element that is an onboarding payload element, unlike embodiment A in which AP pre-connection capability related information is included as an onboarding payload element of an onboarding payload.

As shown in Table 1, the onboarding payload may include TLV data information, and the TLV data information may include the manufacturer-specific element. In this case, the manufacturer-specific element may include various types of data/information that may be designated/specified by the manufacturer. For example, information (AP pre-connection capability related information) used to determine whether the commissionee device (WM) supports AP pre-connection may be included in the manufacturer-specific element. As an embodiment, the AP pre-connection capability related information may be the AP pre-connection capability information of Table 1, but is not limited thereto.

In this case, the commissioner device (TV) may determine whether the commissionee device (WM) supports the AP pre-connection based on the AP pre-connection capability information included in the manufacturer-specific element.

Embodiment C

Embodiment C corresponds to an embodiment of directly identifying whether the commissionee device (WM) supports AP pre-connection based on device information in the onboarding payload. Embodiment C corresponds to an embodiment in which AP pre-connection capability related information is not explicitly included in the onboarding payload, unlike embodiment A/B.

As shown in Table 1, the onboarding payload may include device information such as a vendor ID field/information and a product ID field/information.

In this case, the commissioner device (TV) may obtain the performance information about the corresponding device from an associated server (e.g., a distributed server that provides the device information about the corresponding device) using the device information included in the onboarding payload. For example, the commissioner device (TV) may request the performance information about the corresponding device from the associated server using the device information included in the onboarding payload, and may receive the performance information from the corresponding server.

The performance information about the corresponding device received/obtained from the server may include information (AP pre-connection capability related information) used to determine whether the commissionee device (WM) supports AP pre-connection. As an embodiment, the AP pre-connection capability related information may be the AP pre-connection capability information of Table 1, but is not limited thereto.

When the commissionee device (WM) does not support AP pre-connection, it moves to operation 11040a.

In operation 11040a, the commissioner device (TV) may perform an operation/procedure for discovering the commissionee device (WM) using the discovery method identified based on the onboarding payload. For example, the commissioner device (TV) may perform an operation/procedure for discovering the commissionee device (WM) using any one of the DSN-SD, BLE, and Soft-AP discovery methods, based on the on-boarding payload. For example, the commissioner device (TV) may perform an operation/procedure for discovering the commissionee device (WM) while circulating the DSN-SD, BLE, and Soft-AP discovery methods.

When the commissionee device (WM) supports AP pre-connection, it moves to operation 11050a.

In operation 11050a, the commissioner device (TV) may perform an operation/procedure for discovering the commissionee device (WM) using the DSN-SD discovery method.

Embodiment A

In this embodiment, the commissioner device (TV) may directly/immediately perform an operation for discovering the commissionee device (WM) on an AP network (e.g., a Wi-Fi network) for a preset period. As such, In embodiment A, unlike embodiment B/C to be described below, in which the operation of discovering the commissionee device (WM) is initiated by a notification/request of another device, the operation of discovering the commissionee device (WM) may be directly initiated by the commissioner device (TV).

Embodiment B

In this embodiment, when the commissioner device (TV) receives a notification indicating that the commissionee device (WM) has joined an AP network (e.g., a Wi-Fi network) from the auxiliary device (RC), the commissioner device (TV) may perform an operation for discovering the commissionee device (WM) on the AP network.

Embodiment C

In this embodiment, when the commissioning request is received from the commissionee device (WM) joining the AP network (e.g., Wi-Fi network), the commissioner device (TV) may perform an operation for discovering the commissionee device (WM) on the AP network. As an embodiment, this commissioning request may be performed using, e.g., the user directed commissioning protocol of the matter standard of the connectivity standards alliance (CAS).

In operation 11060a, the commissioner device (TV) may perform an onboarding process with the commissionee device (WM). As an embodiment, the onboarding process may include the above-described device verification operation and/or device connection/registration operation. Accordingly, the commissionee device (WM) may be connected/registered to an IoT platform (or a smart home network).

Figure 11B:
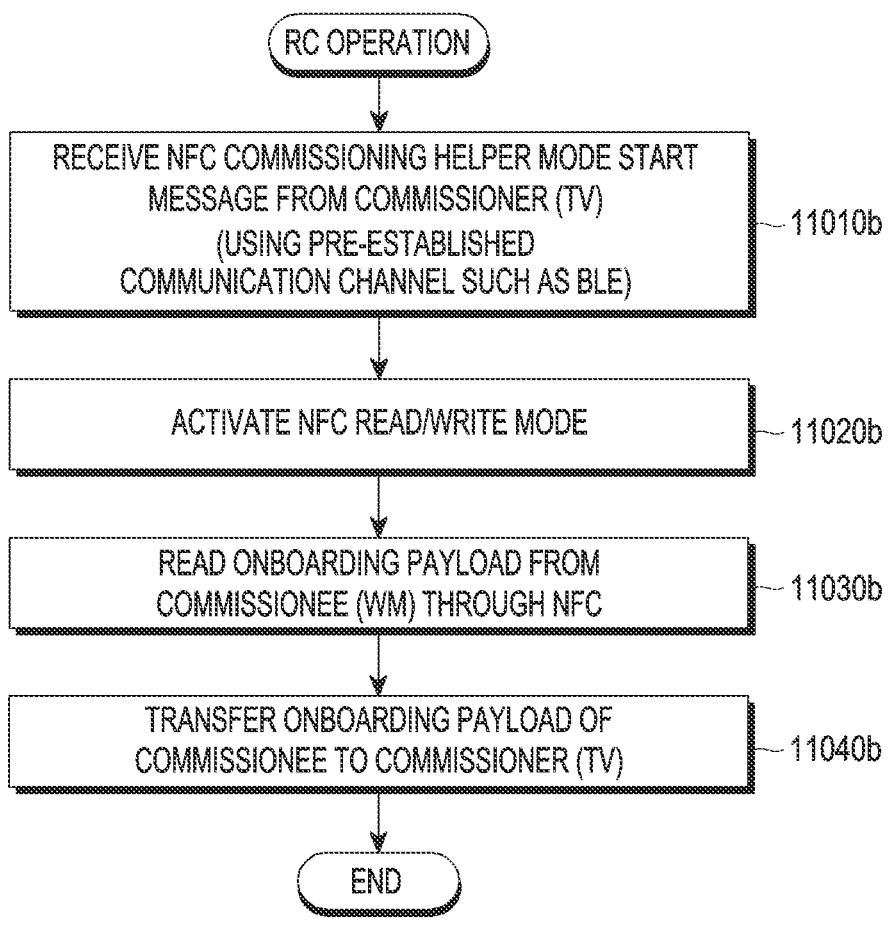
FIG. 11B illustrates an operation of an auxiliary device performing an initial connection method of a commissioning device using the auxiliary device according to the third embodiment of the disclosure.

FIG. 11B illustrates an operation of an auxiliary device performing an initial connection method of a commissioning device using the auxiliary device according to the third embodiment of the disclosure.

In the embodiment of FIG. 11B, a TV is described as an example of the commissioner device, a WM is described as an example of the commissionee device, an RC is described as an example of the auxiliary device, and a Wi-Fi device (network) is described as an example of the AP device (network), but embodiments are not limited thereto as described above.

Further, the embodiment of FIG. 11B illustrates that the commissioner device (TV) communicates with the AP via Wi-Fi, the commissioner device (TV) communicates with the auxiliary device (RC) via BLE (or Wi-Fi, thread), and the auxiliary device (RC) communicates with the commissionee device (WM) via NFC, but embodiments are not limited thereto.

Referring to FIG. 11B. in operation 11010c, the auxiliary device (RC) may receive a commissioning helper mode start message from the commissioner device (TV). As an embodiment, the auxiliary device (RC) may receive the commissioning helper mode start message using a pre-connected communication channel (e.g., BLE). As an embodiment, the commissioning helper mode may be an NFC-based commissioning helper mode.

In operation 11020b, the auxiliary device (RC) may activate the NFC read/write mode.

In operation 11030b, the auxiliary device (RC) may read the onboarding payload from the commissionee device (WM) through NFC (NFC connection). According to an embodiment, the auxiliary device (RC) may receive an on-boarding payload read response message including an on-boarding payload from the commissionee device (WM) through an NFC connection configured with the commissionee device (WM). Here, the onboarding payload read response message corresponds to a response message of the onboarding payload read message.

In operation 11040b, the auxiliary device (RC) may transfer the onboarding payload of the commissionee device (WM) to the commissioner device (TV).

Figure 12:
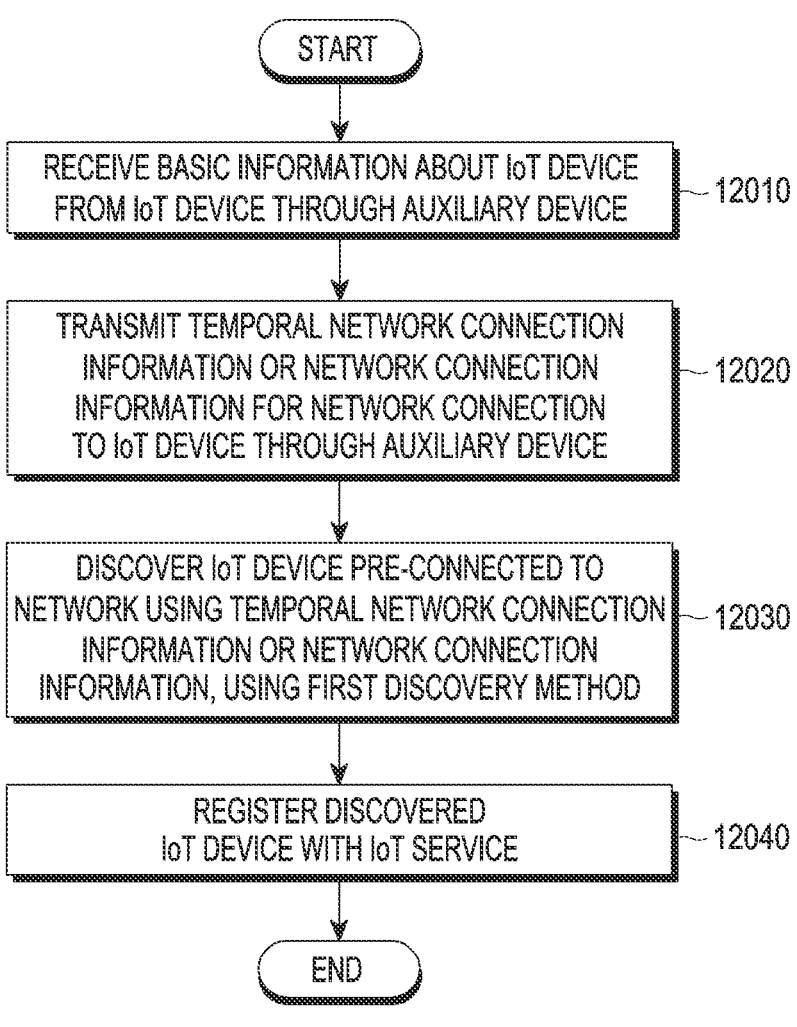
FIG. 12 is a flowchart illustrating a method, performed by an electronic device, for connecting an IoT device to an IoT service using an auxiliary device, according to an embodiment of the disclosure.

FIG. 12 is a flowchart illustrating a method, performed by an electronic device, for connecting an IoT device to an IoT service using an auxiliary device, according to an embodiment of the disclosure.

In the embodiment of FIG. 12, the electronic device may be a commissioner device, the IoT device may be a commissionee device, and the auxiliary device may be a commissioning auxiliary device. The structure of each device may follow, e.g., the structure of FIG. 1.

Referring to FIG. 12. the electronic device may receive basic information about the IoT device from the IoT device through the auxiliary device (12010).

The electronic device may transmit temporal network connection information or network connection information for network connection to the IoT device through the auxiliary device (12020).

The electronic device may discover an IoT device pre-connected to the network using the temporal network connection information or network connection information, using a first discovery method (12030).

The electronic device may register the discovered IoT device in the IoT service (12030).

As an embodiment, the basic information about the IoT device may include AP pre-connection capability related information used to identify whether the IoT device supports an access point (AP) pre-connection function.

As an embodiment, the electronic device may identify whether the IoT device supports the AP pre-connection function, based on the AP pre-connection capability related information, and identify that the first discovery method is used to discover the IoT device when the IoT device supports the AP pre-connection function.

The basic information about the IoT device may be included in the onboarding payload, and the onboarding payload may include at least one of a vendor ID element designating the vendor ID for the IoT device or a product ID element designating the product ID for the IoT device.

According to an embodiment, the AP pre-connection capability related information may be included as an element in the onboarding payload or may be included in a type-length-value (TLV) data element in the onboarding payload.

As an embodiment, the first discovery method may be a domain name service (DNS)-service discovery (SD) discovery method.

As an embodiment, the auxiliary device may communicate with the IoT device using a near field communication (NFC) scheme.

As an embodiment, the temporal network connection information may be generated by the electronic device for the IoT device.

According to an embodiment, the electronic device may delete the temporal network connection information when the discovered IoT device is registered in the IoT service.

As an embodiment, the electronic device may be a TV, the auxiliary device may be a remote controller (RC) supporting an NFC communication function, and the IoT device may be an electronic device supporting an active tag.

Figure 13:
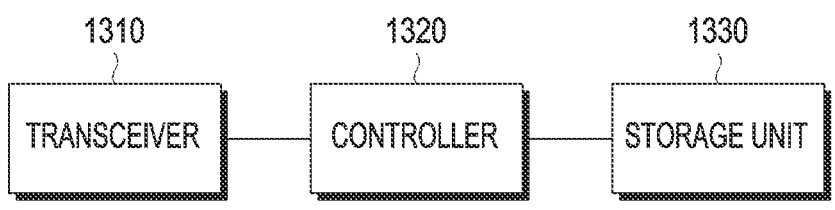
FIG. 13 is a view illustrating a structure of a first electronic device according to an embodiment of the disclosure.

FIG. 13 is a view illustrating a structure of a first electronic device according to an embodiment of the disclosure.

In the embodiment of FIG. 13, the first electronic device may be a commissioner device.

Referring to FIG. 13, the first electronic device may include a transceiver 1310, a controller 1320, and a storage 1330. In the disclosure, the controller may be defined as a circuit or application-specific integrated circuit or at least one processor.

The transceiver 1310 may transmit and receive signals to/from other network entities. The transceiver 1310 may transmit/receive data for commissioning.

The controller 1320 may control the overall operation of the electronic device according to an embodiment. For example, the controller 1320 may control inter-block signal flow to perform the operations according to the above-described flowchart. Specifically, the controller 1320 may control the operations of the electronic device described above with reference to FIGS. 1 to 12.

As an embodiment, the controller 1320 may be configured to receive basic information about the IoT device from the IoT device through the auxiliary device, discover the IoT device using one of at least one discovery method based on the basic information, and register the discovered IoT device in the IoT service.

As an embodiment, the controller 1320 may be further configured to transmit temporal network connection information or network connection information for network connection to the IoT device through the auxiliary device, and discover the IoT device pre-connected to the network using the temporal network connection information or network connection information, using a first discovery method among the at least one discovery method.

As an embodiment, the basic information about the IoT device may include AP pre-connection capability related information used to identify whether the IoT device supports an access point (AP) pre-connection function.

As an embodiment, the controller 1320 may be further configured to identify whether the IoT device supports the AP pre-connection function, based on the AP pre-connection capability related information, and identify that the first discovery method is used to discover the IoT device when the IoT device supports the AP pre-connection function.

The basic information about the IoT device may be included in the onboarding payload, and the onboarding payload may include at least one of a vendor ID element designating the vendor ID for the IoT device or a product ID element designating the product ID for the IoT device.

According to an embodiment, the AP pre-connection capability related information may be included as an element in the onboarding payload or may be included in a type-length-value (TLV) data element in the onboarding payload.

As an embodiment, the first discovery method may be a domain name service (DNS)-service discovery (SD) discovery method.

As an embodiment, the auxiliary device may communicate with the IoT device using a near field communication (NFC) scheme.

As an embodiment, the temporal network connection information may be generated by the electronic device for the IoT device.

As an embodiment, the controller 1320 may be further configured to delete the temporal network connection information when the discovered IoT device is registered in the IoT service.

As an embodiment, the electronic device may be a TV, the auxiliary device may be a remote controller (RC) supporting an NFC communication function, and the IoT device may be an electronic device supporting an active tag.

The storage unit 1330 may store at least one of information transmitted/received via the transceiver 1310 and information generated via the controller 1320. For example, the storage unit 1330 may store information and data necessary for commissioning described above with reference to FIGS. 1 to 12.

Figure 14:
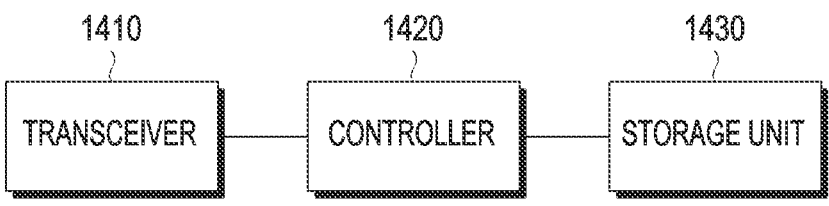
FIG. 14 is a view illustrating a structure of a second electronic device according to an embodiment of the disclosure.

FIG. 14 is a view illustrating a structure of a second electronic device according to an embodiment of the disclosure.

In the embodiment of FIG. 14, the second electronic device may be a commissionee device.

Referring to FIG. 14, the second electronic device may include a transceiver 1410, a controller 1420, and a storage 1430. In the disclosure, the controller may be defined as a circuit or application-specific integrated circuit or at least one processor.

The transceiver 1410 may transmit and receive a signal to and from another device. The transceiver 1410 may transmit/receive data for commissioning.

The controller 1420 may control the overall operation of the commissionee device according to an embodiment. For example, the controller 1420 may control inter-block signal flow to perform the operations according to the above-described flowchart. Specifically, the controller 1420 may control the operations of the commissionee device described above with reference to FIGS. 1 to 12.

The storage unit 1430 may store at least one of information transmitted/received via the transceiver 1410 and information generated via the controller 1420. For example, the storage unit 1430 may store information and data necessary for commissioning described above with reference to FIGS. 1 to 12.

Figure 15:
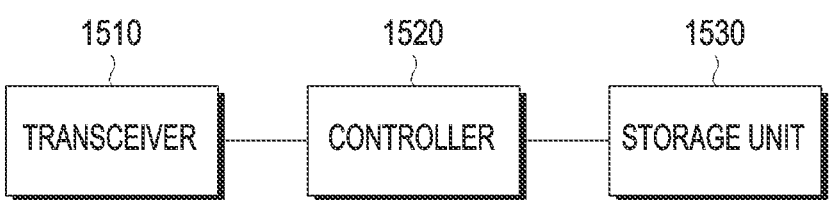
FIG. 15 is a view illustrating a structure of a third electronic device according to an embodiment of the disclosure.

FIG. 15 is a view illustrating a structure of a third electronic device according to an embodiment of the disclosure.

In the embodiment of FIG. 15, the third electronic device may be an auxiliary device.

Referring to FIG. 15, the third electronic device may include a transceiver 1510, a controller 1520, and a storage 1530. In the disclosure, the controller may be defined as a circuit or application-specific integrated circuit or at least one processor.

The transceiver 1510 may transmit and receive a signal to and from another device. The transceiver 1510 may transmit/receive data for commissioning.

The controller 1520 may control the overall operation of the auxiliary device according to an embodiment. For example, the controller 1520 may control inter-block signal flow to perform the operations according to the above-described flowchart. Specifically, the controller 1520 may control the operations of the commissionee device described above with reference to FIGS. 1 to 12.

The storage unit 1530 may store at least one of information transmitted/received via the transceiver 1510 and information generated via the controller 1520. For example, the storage unit 1530 may store information and data necessary for commissioning described above with reference to FIGS. 1 to 12.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Meanwhile, although specific embodiments of the present disclosure have been described above, various changes may be made thereto without departing from the scope of the present disclosure. Thus, the scope of the present invention should not be limited to the above-described embodiments, and should rather be defined by the following claims and equivalents thereof.

The invention claimed is:

1. A method for connecting an Internet of things (IoT) device to an IoT service using an auxiliary device, by an electronic device, the method comprising:
   receiving, from the IoT device, basic information about the IoT device through the auxiliary device;
   discovering the IoT device using one of at least one discovery method based on the basic information; and
   registering the discovered IoT device with the IoT service, wherein the auxiliary device supports a communication function with the electronic device and the IoT device, and
   wherein the basic information about the IoT device includes access point (AP) pre-connection capability information indicating whether the IoT device supports an AP pre-connection function.

2. The method of claim 1, further comprising:
   transmitting, to the IoT device, temporal network connection information or network connection information for network connection through the auxiliary device,
   wherein discovering the IoT device includes discovering the IoT device pre-connected to a network using the temporal network connection information or the network connection information, using a first discovery method among the at least one discovery method.

3. The method of claim 2, further comprising:
   identifying whether the IoT device supports the AP pre-connection function based on the AP pre-connection capability information; and
   in case that the IoT device supports the AP pre-connection function, identifying that the first discovery method is used to discover the IoT device.

4. The method of claim 3, wherein the AP pre-connection capability information is included as an element in an onboarding payload, or is included in a type-length-value (TLV) data element in the onboarding payload.

5. The method of claim 2,
   wherein the basic information about the IoT device is included in an onboarding payload, and
   wherein the onboarding payload includes at least one of a vendor ID element designating a vendor ID for the IoT device or a product ID element designating a product ID for the IoT device.

6. The method of claim 2, wherein the first discovery method is a domain name service (DNS)-service discovery (SD) discovery method.

7. The method of claim 2, wherein the temporal network connection information is generated by the electronic device for the IoT device.

8. The method of claim 2, further comprising, in case that the discovered IoT device is registered with the IoT service, deleting the temporal network connection information.

9. The method of claim 1, wherein the auxiliary device communicates with the IoT device using a near field communication (NFC) method.

10. The method of claim 1, wherein the electronic device is a TV, the auxiliary device is a remote controller (RC) supporting an NFC communication function, and the IoT device is an electronic device supporting an active tag.

11. An electronic device for connecting an Internet of things (IoT) device to an IoT service using an auxiliary device, the electronic device comprising:
   a transceiver;
   memory, comprising one or more storage media, storing instructions; and
   one or more processors communicatively coupled to the transceiver and the memory,
   wherein the instructions, when executed by the one or more processors individually or collectively, cause the electronic device to:
      receive, from the IoT device, basic information about the IoT device through the auxiliary device;
      discover the IoT device using one of at least one discovery method based on the basic information; and
      register the discovered IoT device with the IoT service, wherein the auxiliary device supports a communication function with the electronic device and the IoT device, and wherein the basic information about the IoT device includes access point (AP) pre-connection capability information indicating whether the IoT device supports an AP pre-connection function.

12. The electronic device of claim 11, wherein the instructions, when executed by the one or more processors individually or collectively, further cause the electronic device to:

transmit, to the IoT device, temporal network connection information or network connection information for network connection through the auxiliary device; and discover the IoT device pre-connected to a network using the temporal network connection information or the network connection information, using a first discovery method among the at least one discovery method.

13. The electronic device of claim 12, wherein the basic information about the IoT device is included in an onboarding payload, and wherein the onboarding payload includes at least one of a vendor ID element designating a vendor ID for the IoT device or a product ID element designating a product ID for the IoT device.

14. The electronic device of claim 12, wherein the first discovery method is a domain name service (DNS)-service discovery (SD) discovery method.

15. The electronic device of claim 12, wherein the temporal network connection information is generated by the electronic device for the IoT device.

16. The electronic device of claim 12, wherein the instructions, when executed by the one or more processors individually or collectively, further cause the electronic device to:

identify whether the IoT device supports the AP pre-connection function based on the AP pre-connection capability information; and in case that the IoT device supports the AP pre-connection function, identify that the first discovery method is used to discover the IoT device.

17. The electronic device of claim 16, wherein the AP pre-connection capability information is included as an element in an onboarding payload, or is included in a type-length-value (TLV) data element in the onboarding payload.

18. The electronic device of claim 11, wherein the auxiliary device communicates with the IoT device using a near field communication (NFC) method.

19. The electronic device of claim 11, wherein the electronic device is a TV, the auxiliary device is a remote controller (RC) supporting an NFC communication function, and the IoT device is an electronic device supporting an active tag.

* * * * *